United States Patent
Lee

(10) Patent No.: US 10,986,367 B2
(45) Date of Patent: Apr. 20, 2021

(54) INTER PREDICTION MODE-BASED IMAGE PROCESSING METHOD AND APPARATUS THEREFOR

(71) Applicant: LG ELECTRONICS INC., Seoul (KR)

(72) Inventor: Jaeho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/346,775

(22) PCT Filed: Nov. 4, 2016

(86) PCT No.: PCT/KR2016/012669
§ 371 (c)(1),
(2) Date: May 1, 2019

(87) PCT Pub. No.: WO2018/084339
PCT Pub. Date: May 11, 2018

(65) Prior Publication Data
US 2020/0053387 A1    Feb. 13, 2020

(51) Int. Cl.
*H04N 19/577*    (2014.01)
*H04N 19/172*    (2014.01)
(Continued)

(52) U.S. Cl.
CPC ......... *H04N 19/577* (2014.11); *H04N 19/172* (2014.11); *H04N 19/52* (2014.11); *H04N 19/573* (2014.11)

(58) Field of Classification Search
None
See application file for complete search history.

(56) References Cited

U.S. PATENT DOCUMENTS

| 8,644,384 B2* | 2/2014 | Tian | H04N 19/573 |
| | | | 375/240.12 |
| 2013/0083851 A1* | 4/2013 | Alshin | H04N 19/182 |
| | | | 375/240.14 |

(Continued)

FOREIGN PATENT DOCUMENTS

| KR | 10-2011-0120215 A | 11/2011 |
| KR | 10-2016-0024908 A | 3/2016 |
| WO | 2012-108181 A1 | 8/2016 |

OTHER PUBLICATIONS

Jianle Chen, Algorithm Description of Joint Exploration Test Model 4, JV ET document, JVET-D1001_v1, Oct. 28, 2016.

*Primary Examiner* — Nancy Bitar
(74) *Attorney, Agent, or Firm* — Dentons US LLP

(57) ABSTRACT

Disclosed is a method for processing an image based on an inter prediction and an apparatus for the same. Particularly, the method may include generating a bi-directional predictor of each pixel of a current block by performing a bi-directional inter prediction based on a motion vector of the current block; deriving a first motion vector from a window area of a specific size in a first reference picture for a current pixel, and deriving a second motion vector from a window area of a specific size in a second reference picture for the current pixel; deriving a first predictor for the current pixel using the first motion vector, and deriving a second predictor for the current pixel using the second motion vector; and generating a third predictor of each pixel of the current block by performing a weighted sum of the first predictor and the second predictor.

5 Claims, 20 Drawing Sheets

(51) Int. Cl.
*H04N 19/573* (2014.01)
*H04N 19/52* (2014.01)

(56) References Cited

U.S. PATENT DOCUMENTS

2013/0136185 A1 5/2013 Tian et al.
2018/0249172 A1* 8/2018 Chen .................... H04N 19/577

* cited by examiner

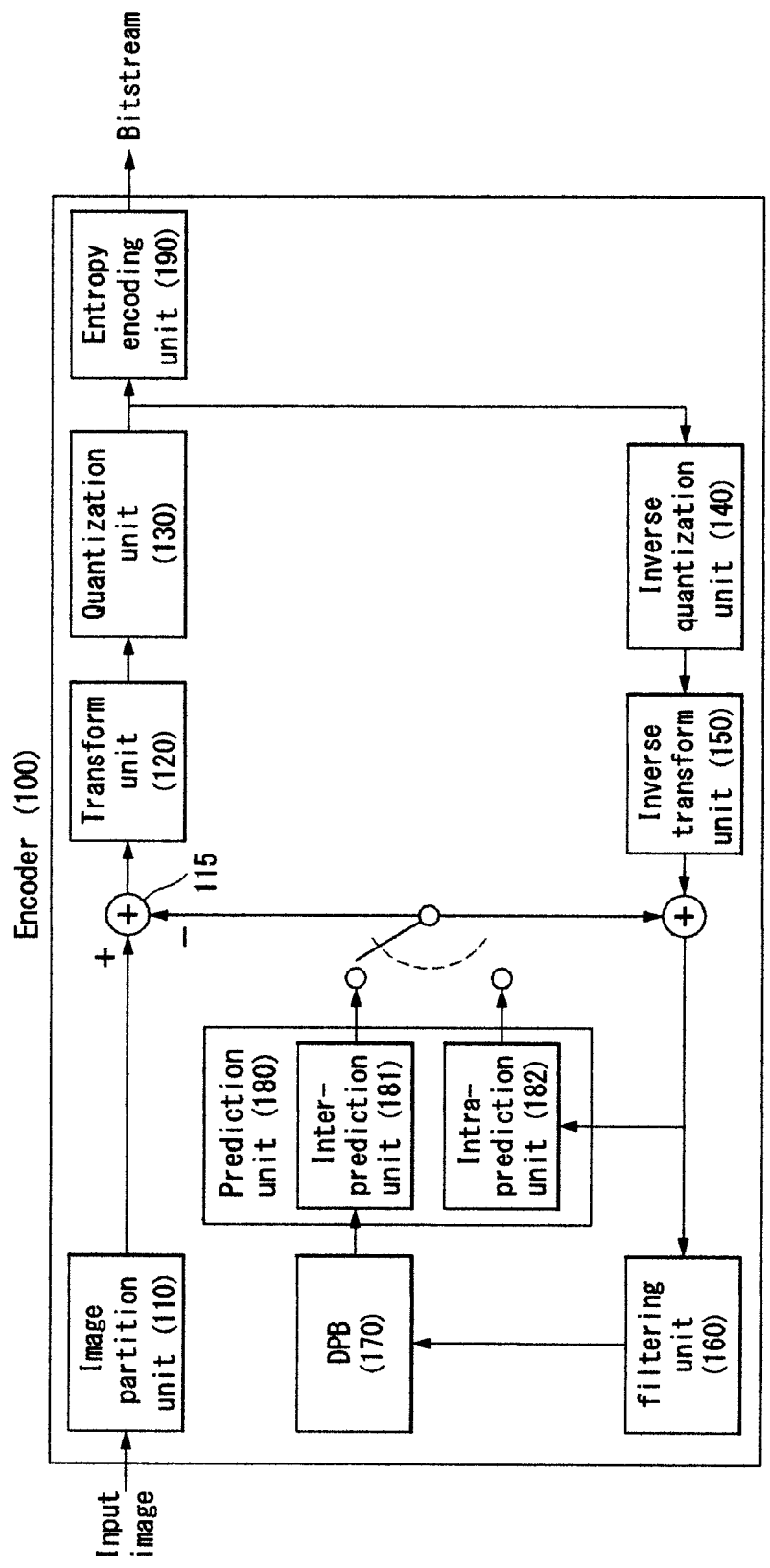
[Fig. 1]

[Fig. 2]
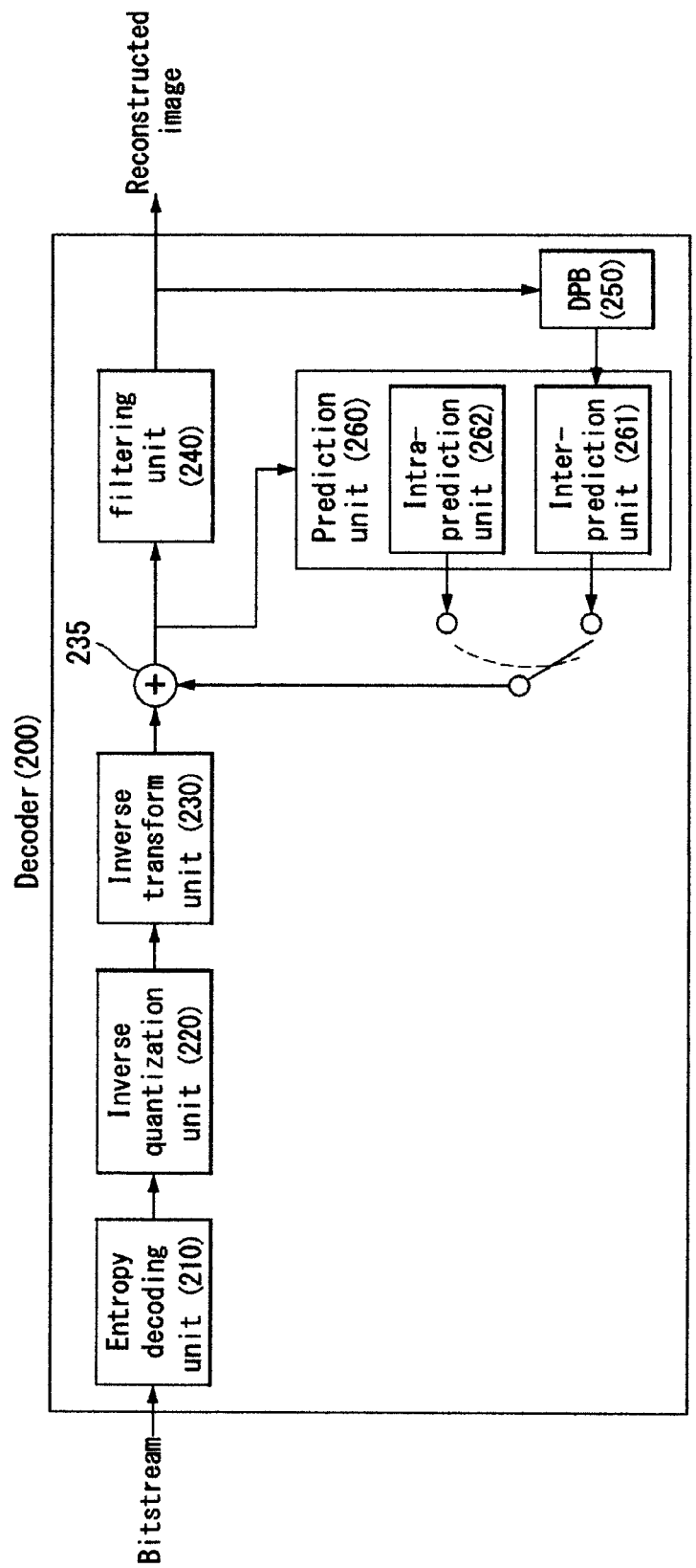

[Fig. 3]
Depth = 0
Depth = 1
Depth = 2
Depth = 3
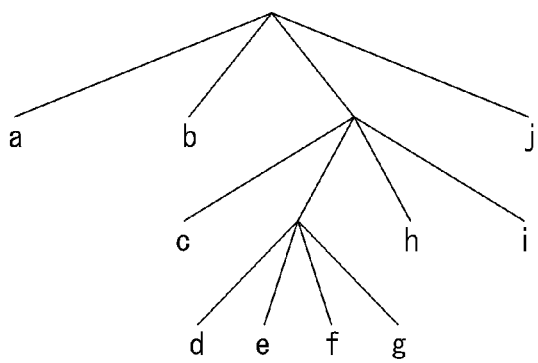
(A)
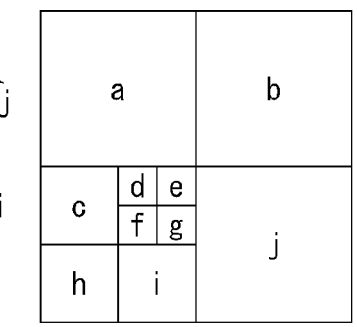
(B)

[Fig. 4]
Intra:
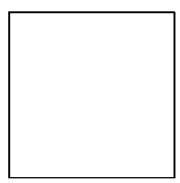 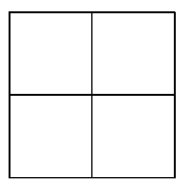
2Nx2N    NxN
Inter:
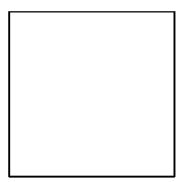 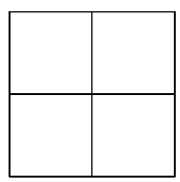 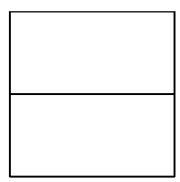 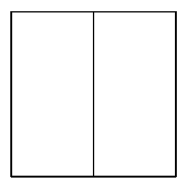
2Nx2N    NxN    2NxN    Nx2N
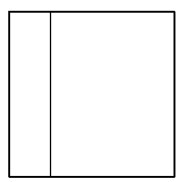 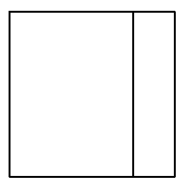 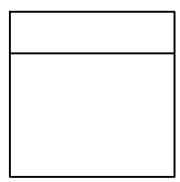 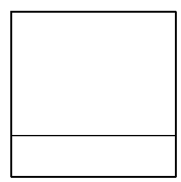
nLx2N    nRx2N    2NxnU    2NxnD

[Fig. 5]
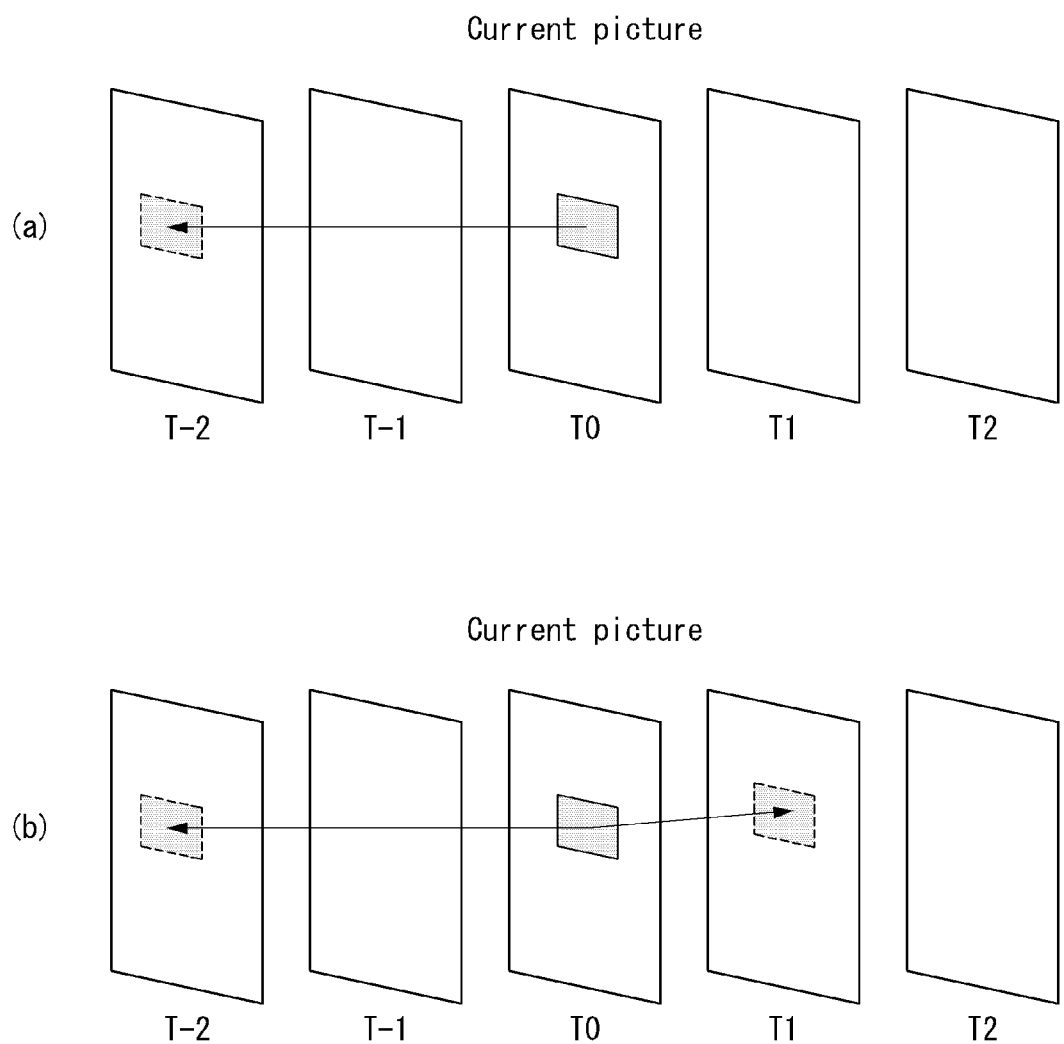

[Fig. 6]

| A -1,-1 | | | | A 0,-1 | a 0,-1 | b 0,-1 | c 0,-1 | A 1,-1 | | | | A 2,-1 |
|---|---|---|---|---|---|---|---|---|---|---|---|---|
| | | | | | | | | | | | | |
| | | | | | | | | | | | | |
| | | | | | | | | | | | | |
| A -1,0 | | | | A 0,0 | a 0,0 | b 0,0 | c 0,0 | A 1,0 | | | | A 2,0 |
| d -1,0 | | | | d 0,0 | e 0,0 | f 0,0 | g 0,0 | d 1,0 | | | | d 2,0 |
| h -1,0 | | | | h 0,0 | i 0,0 | j 0,0 | k 0,0 | h 1,0 | | | | h 2,0 |
| n -1,0 | | | | n 0,0 | p 0,0 | q 0,0 | r 0,0 | n 1,0 | | | | n 2,0 |
| A -1,1 | | | | A 0,1 | a 0,1 | b 0,1 | c 0,1 | A 1,1 | | | | A 2,1 |
| | | | | | | | | | | | | |
| | | | | | | | | | | | | |
| | | | | | | | | | | | | |
| A -1,2 | | | | A 0,2 | a 0,2 | b 0,2 | c 0,2 | A 1,2 | | | | A 2,2 |

[Fig. 7]
(a)
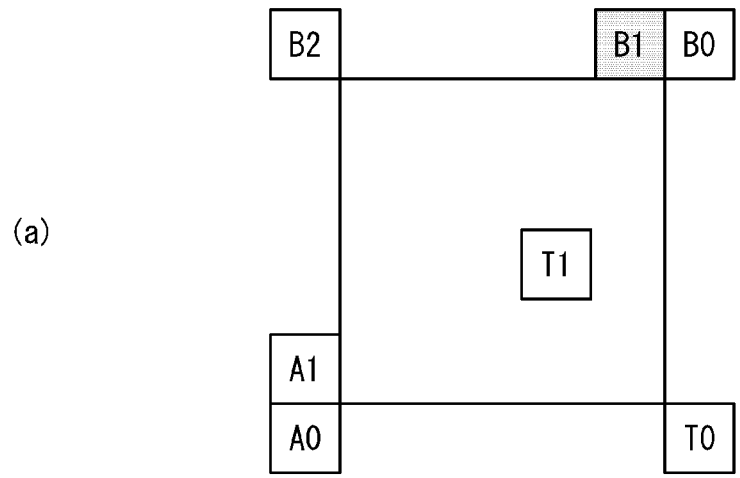
(b)
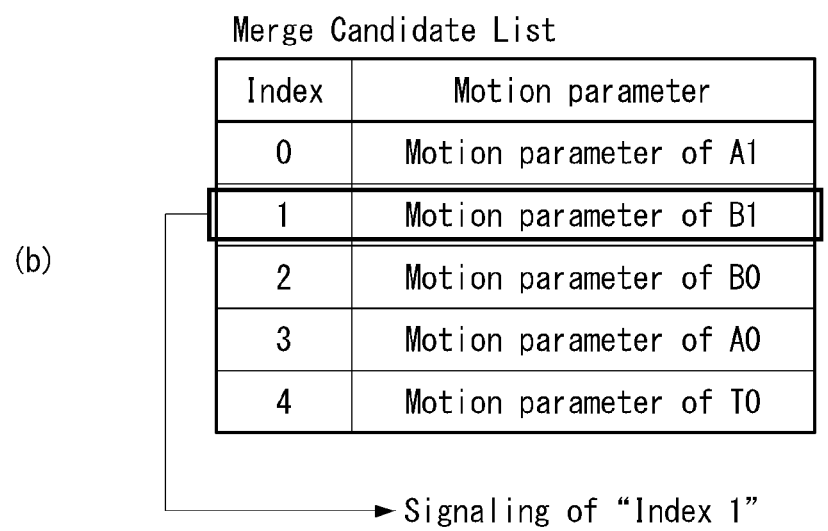

[Fig. 8]
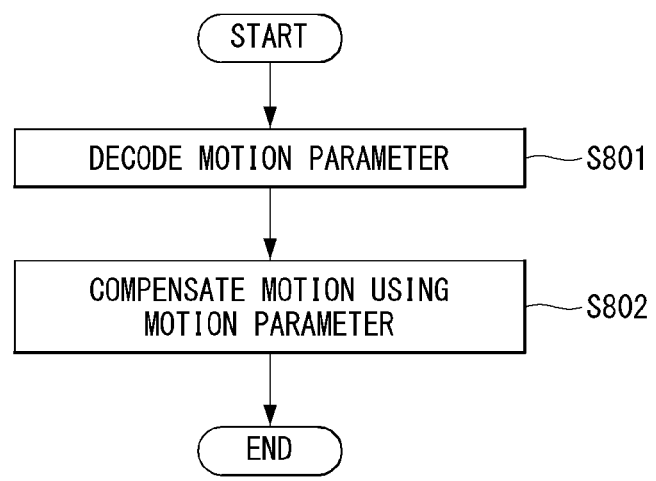

[Fig. 9]
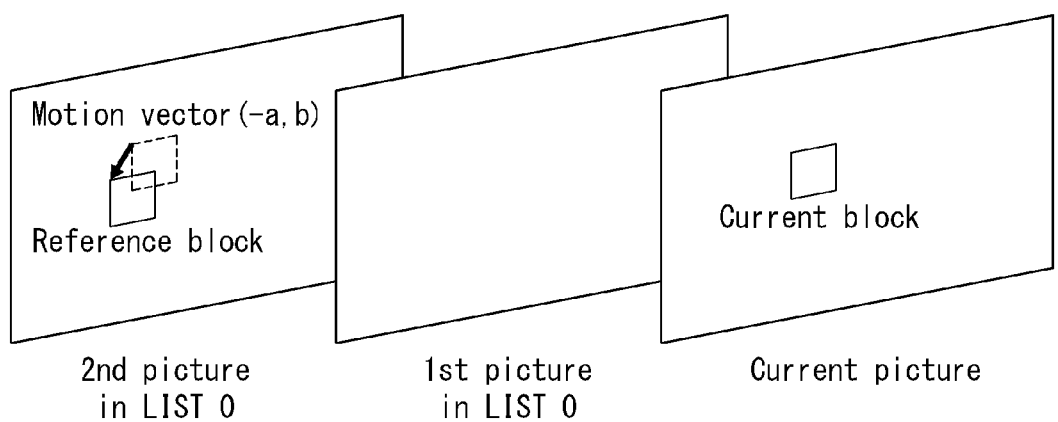

[Fig. 10]
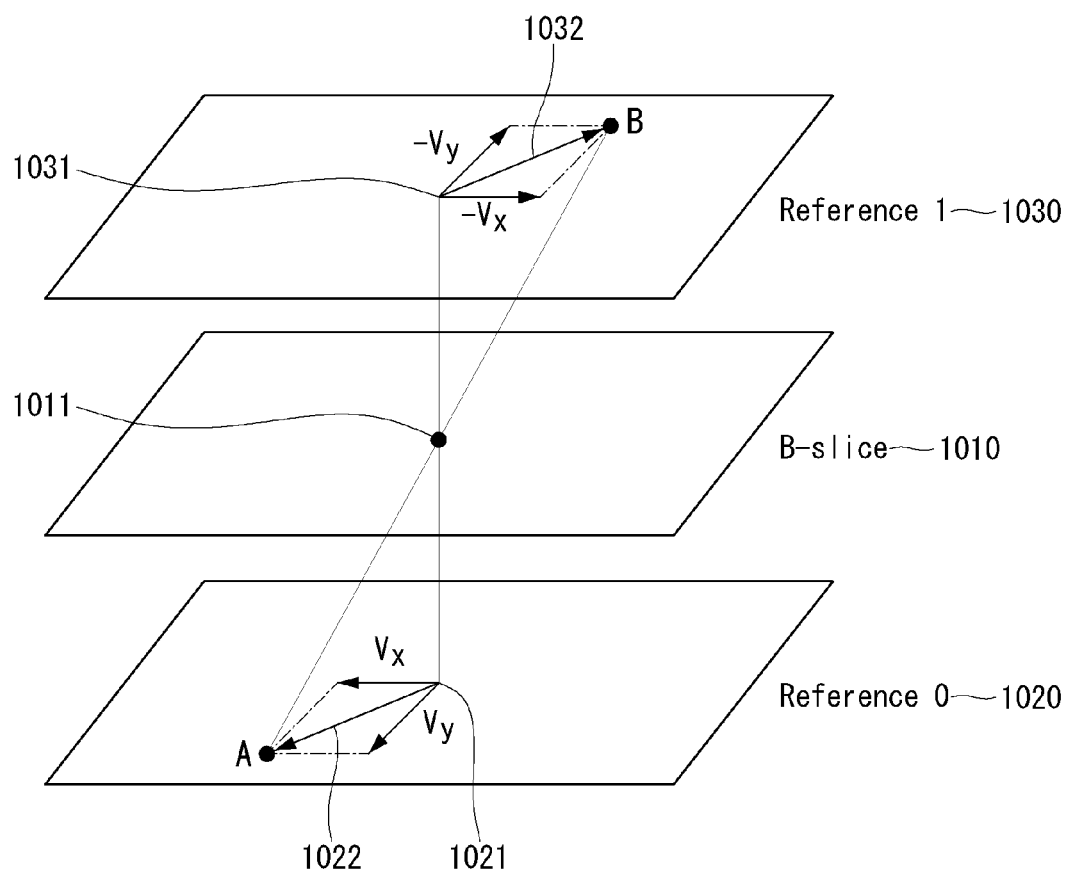

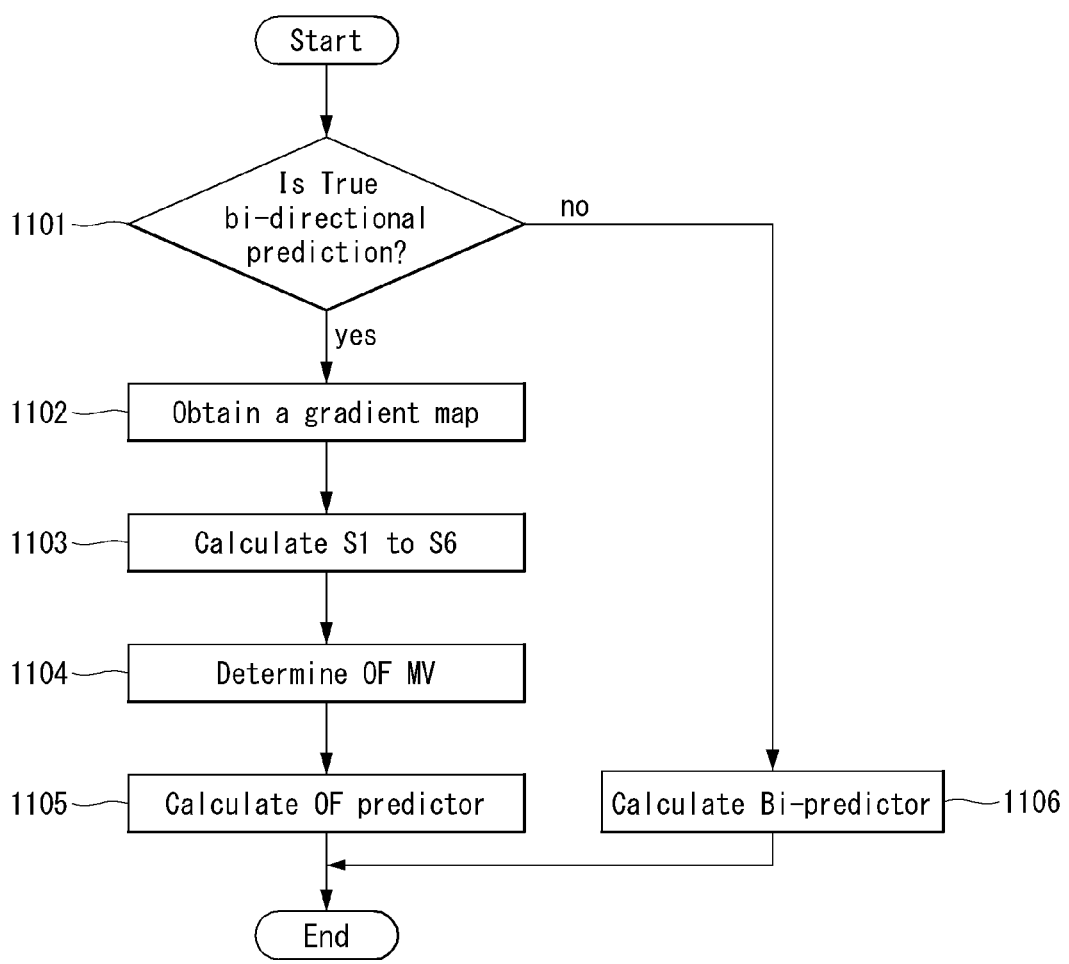
[Fig. 11]

[Fig. 12]
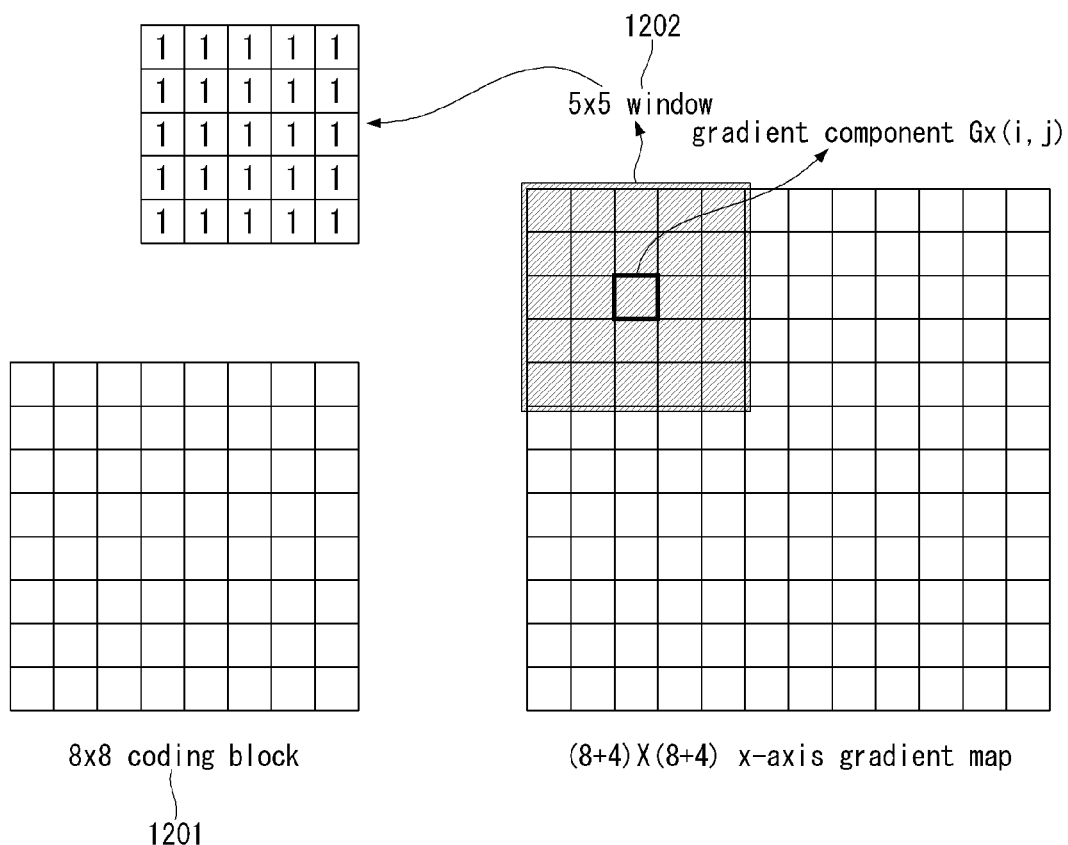

[Fig. 13]
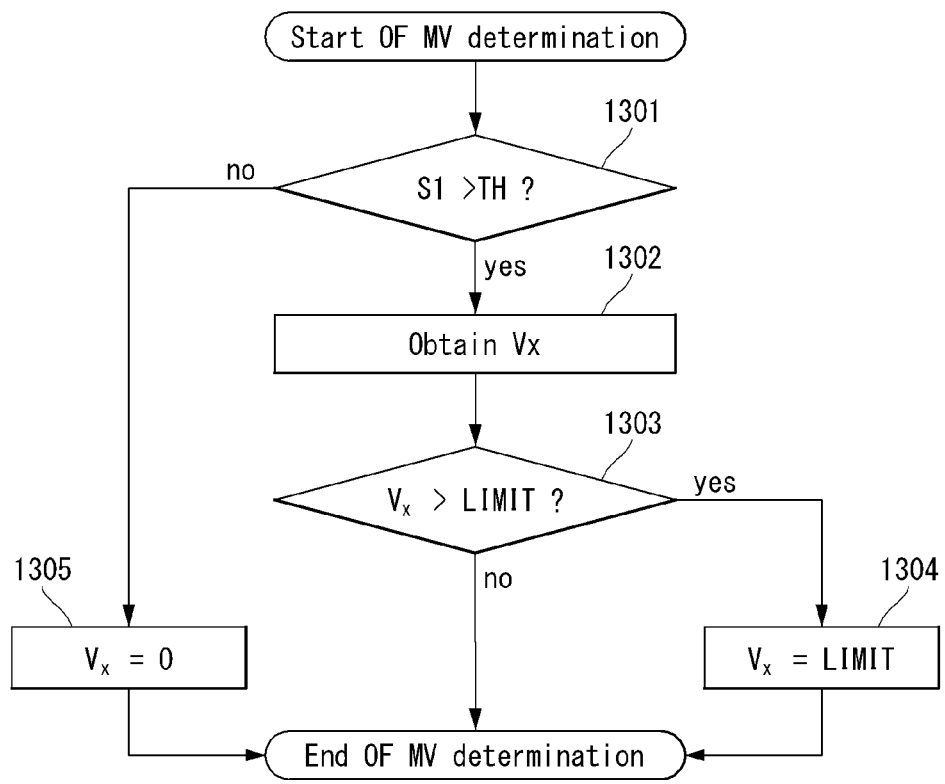

[Fig. 14]
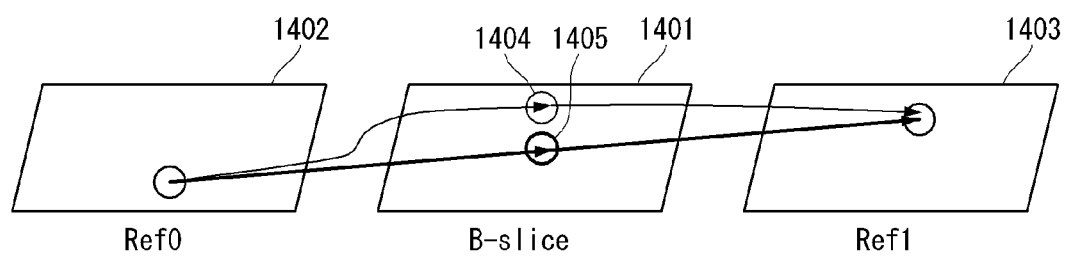
→ : Actual motion
→ : Estimated motion
○ : Object position in frame
○ : Estimated object position

[Fig. 15]
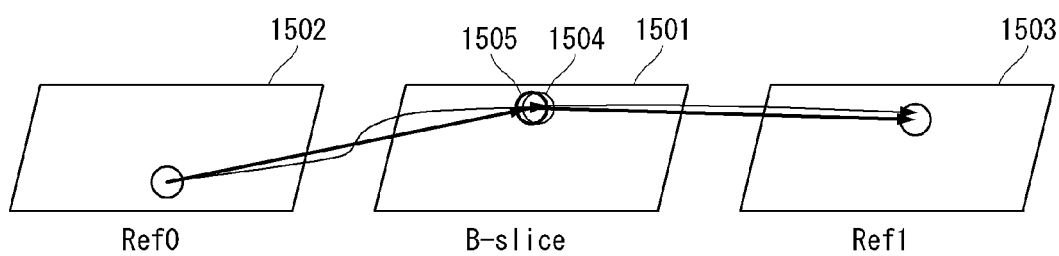
⟶ : Actual motion
⟶ : Estimated motion
◯ : Object position in frame
◯ : Estimated object position

[Fig. 16]
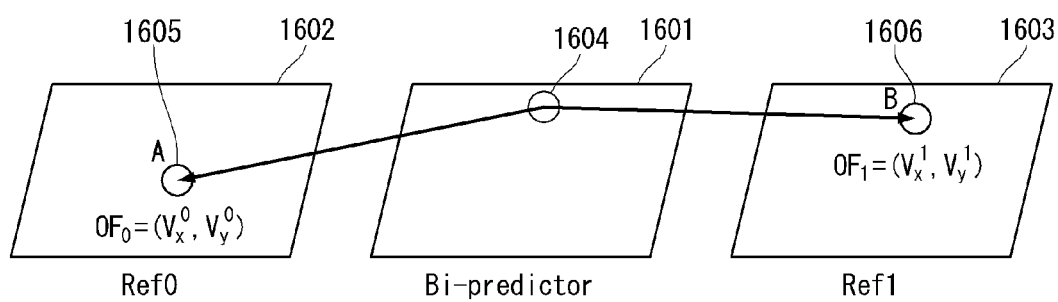

[Fig. 17]
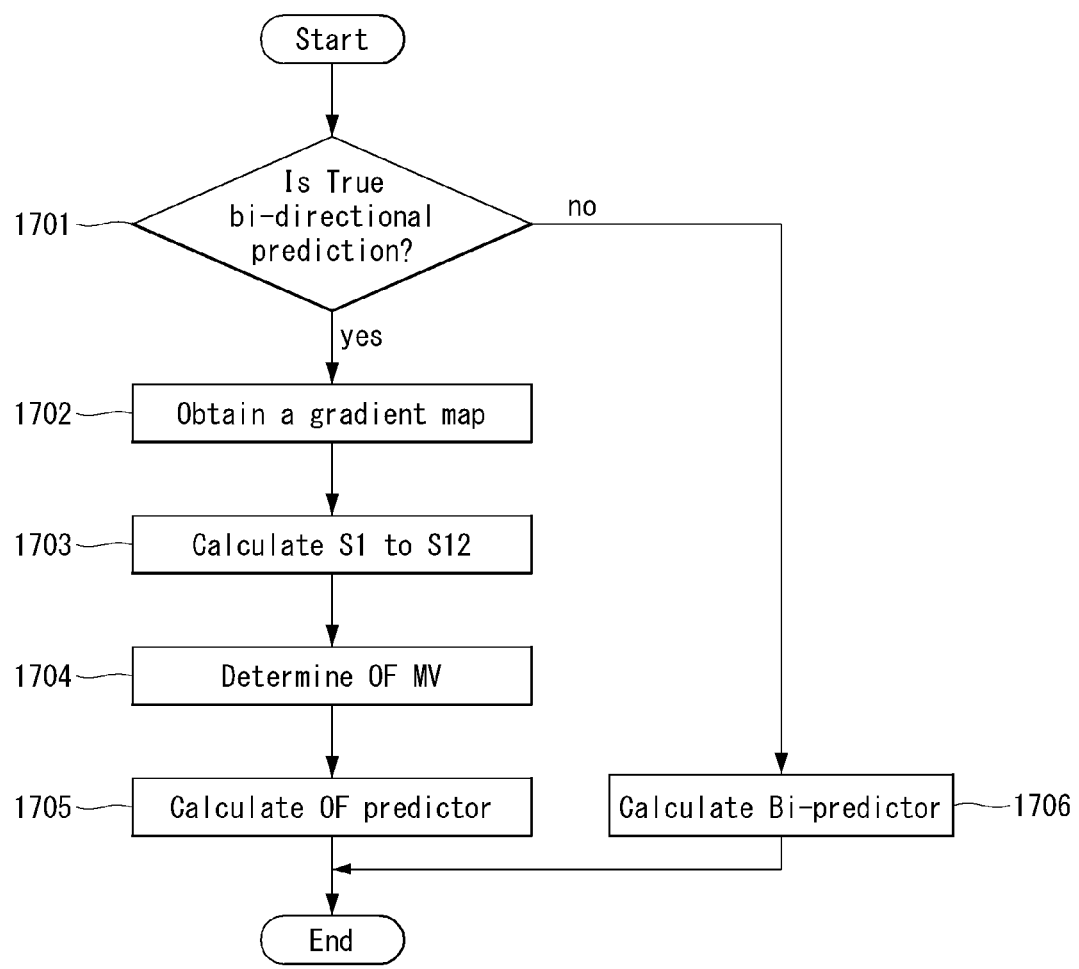

[Fig. 18]
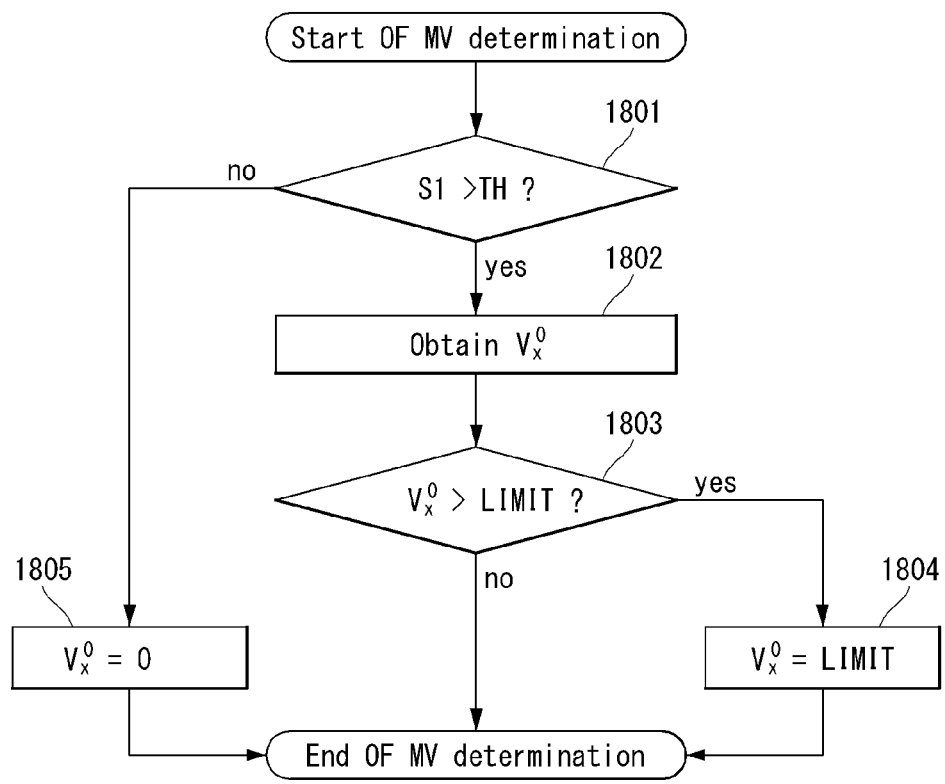

[Fig. 19]
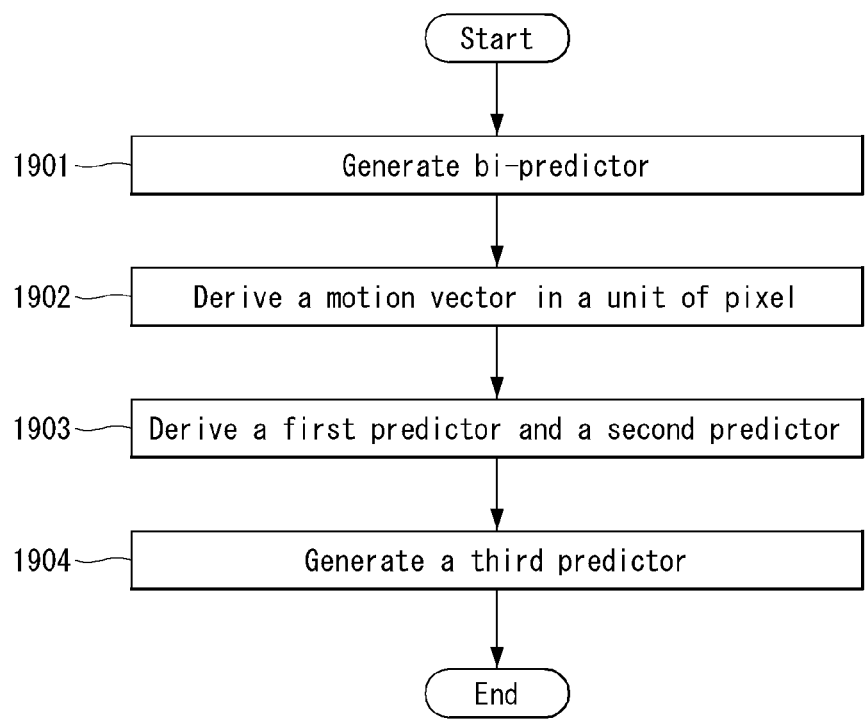

[Fig. 20]
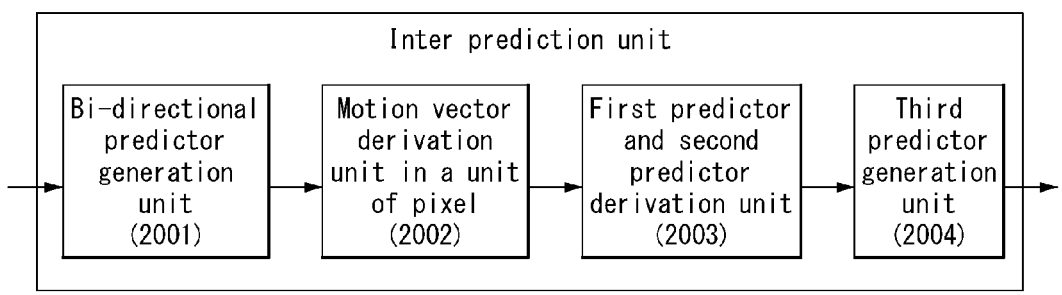

INTER PREDICTION MODE-BASED IMAGE PROCESSING METHOD AND APPARATUS THEREFOR

CROSS-REFERENCE TO RELATED APPLICATIONS

This application is the National Stage filing under 35 U.S.C. 371 of International Application No. PCT/KR2016/012669, filed on Nov. 4, 2016, the contents of which are all hereby incorporated by reference herein in their entirety.

TECHNICAL FIELD

The present invention relates to a method of processing a still image or a moving image and, more particularly, to a method of encoding/decoding a still image or a moving image based on an inter-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

According to the existing Bi-directional Optical Flow (BIO) method, a motion compensation is performed in a unit of pixel under the assumption that a motion of an object is linear between two reference pictures. However, in an actual picture, an object may have a non-linear motion in many cases, and in this case, there is a restriction in representing the non-linear motion of an object in the case of following the existing method, and owing to this, an accuracy of a prediction may be degraded.

In order to solve the problem, an object of the present invention is to propose a method for representing a non-linear motion efficiently while an advantage of the existing linear motion is utilized selectively.

In addition, an object of the present invention is to propose a method for performing motion compensation in a unit of pixel by using a prediction value obtained by the existing bi-directional inter prediction for subdividing a motion of an object between two reference pictures.

Technical objects to be achieved in the present invention are not limited to the aforementioned technical objects, and other technical objects not described above may be evidently understood by a person having ordinary skill in the art to which the present invention pertains from the following description.

Technical Solution

According to an aspect of the present invention, a method for processing an image based on an inter prediction may include generating a bi-directional predictor of each pixel of a current block by performing a bi-directional inter prediction based on a motion vector of the current block; deriving a first motion vector from a window area of a specific size in a first reference picture for a current pixel, and deriving a second motion vector from a window area of a specific size in a second reference picture for the current pixel; deriving a first predictor for the current pixel by using the first motion vector, and deriving a second predictor for the current pixel by using the second motion vector; and generating a third predictor of each pixel of the current block by performing a weighted sum of the first predictor and the second predictor.

According to another aspect of the present invention, an apparatus for processing an image based on an inter prediction may include a bi-directional predictor generation unit for generating a bi-directional predictor of each pixel of a current block by performing a bi-directional inter prediction based on a motion vector of the current block; a motion vector derivation unit in a unit of pixel for deriving a first motion vector from a window area of a specific size in a first reference picture for a current pixel, and deriving a second motion vector from a window area of a specific size in a second reference picture for the current pixel; a first predictor and second predictor derivation unit for deriving a first predictor for the current pixel by using the first motion vector, and deriving a second predictor for the current pixel by using the second motion vector; and a third predictor generation unit for generating a third predictor of each pixel of the current block by performing a weighted sum of the first predictor and the second predictor.

Preferably, the first motion vector may be determined with a motion vector in which a predictor is derived, which minimizes a difference from the bi-directional predictor for each pixel in the window area in the first reference picture, and the second motion vector may be determined with a motion vector in which a predictor is derived, which minimizes a difference from the bi-directional predictor for each pixel in the window area in the second reference picture.

Preferably, the first motion vector may be derived with a motion vector that minimizes a sum of a gradient for each pixel and a sum of a difference from the bi-directional predictor for each pixel in the window area in the first reference picture, and the second motion vector may be derived with a motion vector that minimizes a sum of a gradient for each pixel and a sum of a difference from the bi-directional predictor for each pixel in the window area in the second reference picture.

Preferably, the first motion vector may be derived using a difference value between a gradient for each pixel and the bi-directional predictor in the window area in the first reference picture, and the second motion vector may be derived using a difference value between a gradient for each pixel and the bi-directional predictor in the window area in the second reference picture.

Preferably, a vertical directional component and a horizontal directional component of the gradient may be obtained by using a difference value between a horizontal direction pixel value and a vertical direction pixel value with a pixel of which coordinate is collocated with the current pixel in a center in the first reference picture or the second reference picture.

Preferably, a vertical directional component and a horizontal directional component of the gradient may be obtained by applying interpolation filters of a horizontal direction and a vertical direction with a pixel of which coordinate is collocated with the current pixel in a center in the first reference picture or the second reference picture.

Preferably, the first predictor may be generated by using a gradient for each pixel and the first motion vector in the window area in the first reference picture, and the second predictor may be generated by using a gradient for each pixel and the second motion vector in the window area in the second reference picture.

Preferably, a horizontal directional component of the first motion vector may be configured as 0, when a sum of squared values of the horizontal directional component of a gradient for each pixel is smaller than a specific threshold value, a vertical directional component of the first motion vector may be configured as 0, when a sum of squared values of the vertical directional component of a gradient for each pixel is smaller than a specific threshold value, a horizontal directional component of the second motion vector may be configured as 0, when a sum of squared values of the horizontal directional component of a gradient for each pixel is smaller than a specific threshold value, and a vertical directional component of the second motion vector may be configured as 0, when a sum of squared values of the vertical directional component of a gradient for each pixel is smaller than a specific threshold value.

Technical Effects

According to an embodiment of the present invention, a motion of an object having a non-linear motion as well as an object having a linear motion are efficiently represented, and an accuracy of prediction may be improved.

In addition, according to an embodiment of the present invention, a prediction value obtained by the existing bi-directional inter prediction between two reference pictures is used, and accordingly, a motion of an object may be accurately represented in comparison with the existing method, and through this, an encoding efficiently may be improved.

In addition, according to an embodiment of the present invention, an optical flow is applied and motion information in a unit of pixel is reflected in a prediction without transmitting an additional motion vector, and accordingly, compression performance of a picture may be improved.

Technical effects which may be obtained in the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and is a diagram illustrating the direction of inter-prediction.

FIG. 6 is an embodiment to which the present invention may be applied and illustrates integers for ¼ sample interpolation and a fraction sample locations.

FIG. 7 is an embodiment to which the present invention may be applied and illustrates the location of a spatial candidate.

FIG. 8 is an embodiment to which the present invention is applied and is a diagram illustrating an inter-prediction method.

FIG. 9 is an embodiment to which the present invention may be applied and is a diagram illustrating a motion compensation process.

FIG. 10 illustrates a bi-directional prediction method of a picture having a steady motion as an embodiment to which the present invention may be applied.

FIG. 11 is a diagram illustrating a motion compensation method through the bi-directional prediction according to an embodiment of the present invention.

FIG. 12 is a diagram illustrating a method for determining a gradient map according to an embodiment of the present invention.

FIG. 13 is a diagram illustrating a method of determining an optical flow motion vector according to an embodiment of the present invention.

FIG. 14 is a diagram for describing a motion compensation method of a unit of pixel considering a non-linear motion as an embodiment to which the present invention is applied.

FIG. 15 is a diagram for illustrating a motion compensation method of a unit of pixel considering a non-linear motion as an embodiment to which the present invention is applied.

FIG. 16 is a diagram for illustrating a motion compensation method of a unit of pixel considering a non-linear motion as an embodiment to which the present invention is applied.

FIG. 17 is a diagram illustrating a motion compensation method through the bi-directional prediction according to an embodiment of the present invention.

FIG. 18 is a diagram illustrating a method of determining an optical flow motion vector according to an embodiment of the present invention.

FIG. 19 is a diagram illustrating a method for processing an image based in an inter prediction according to an embodiment of the present invention.

FIG. 20 is a diagram illustrating an inter prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PU) or transform block (TB) for a chroma component. Also, the present invention is not limited to this, and the processing unit may be interpreted to include a unit for the luma component and a unit for the chroma component.

Furthermore, a processing unit is not essentially limited to a square block and may be constructed in a polygon form having three or more vertices.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequantization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Split Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(*b*), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(*b*), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(*b*), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. ACU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and l have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture or other pictures including the current processing unit may be used.

A picture (slice) using only a current picture for reconstruction, that is, on which only intra-prediction is performed, may be called an intra-picture or I picture (slice), a picture (slice) using a maximum of one motion vector and reference index in order to predict each unit may be called a predictive picture or P picture (slice), and a picture (slice) using a maximum of two motion vector and reference indices may be called a bi-predictive picture or B a picture (slice).

Intra-prediction means a prediction method of deriving a current processing block from the data element (e.g., a sample value) of the same decoded picture (or slice). That is, intra-prediction means a method of predicting the pixel value of a current processing block with reference to reconstructed regions within a current picture.

Hereinafter, inter-prediction is described in more detail.

Inter-Prediction (or Inter-Frame Prediction)

Inter-prediction means a prediction method of deriving a current processing block based on the data element (e.g., sample value or motion vector) of a picture other than a current picture. That is, inter-prediction means a method of predicting the pixel value of a current processing block with reference to reconstructed regions within another reconstructed picture other than a current picture.

Inter-prediction (or inter-picture prediction) is a technology for removing redundancy present between pictures and is chiefly performed through motion estimation and motion compensation.

FIG. 5 is an embodiment to which the present invention may be applied and is a diagram illustrating the direction of inter-prediction.

Referring to FIG. 5, inter-prediction may be divided into uni-direction prediction in which only one past picture or future picture is used as a reference picture on a time axis with respect to a single block and bi-directional prediction in which both the past and future pictures are referred at the same time.

Furthermore, the uni-direction prediction may be divided into forward direction prediction in which a single reference picture temporally displayed (or output) prior to a current picture is used and backward direction prediction in which a single reference picture temporally displayed (or output) after a current picture is used.

In the inter-prediction process (i.e., uni-direction or bi-directional prediction), a motion parameter (or information) used to specify which reference region (or reference block) is used in predicting a current block includes an inter-prediction mode (in this case, the inter-prediction mode may indicate a reference direction (i.e., uni-direction or bidirectional) and a reference list (i.e., L0, L1 or bidirectional)), a reference index (or reference picture index or reference list index), and motion vector information. The motion vector information may include a motion vector, motion vector prediction (MVP) or a motion vector difference (MVD). The motion vector difference means a difference between a motion vector and a motion vector predictor.

In the uni-direction prediction, a motion parameter for one-side direction is used. That is, one motion parameter may be necessary to specify a reference region (or reference block).

In the bi-directional prediction, a motion parameter for both directions is used. In the bi-directional prediction method, a maximum of two reference regions may be used. The two reference regions may be present in the same reference picture or may be present in different pictures. That is, in the bi-directional prediction method, a maximum of two motion parameters may be used. Two motion vectors may have the same reference picture index or may have different reference picture indices. In this case, the reference pictures may be displayed temporally prior to a current picture or may be displayed (or output) temporally after a current picture.

The encoder performs motion estimation in which a reference region most similar to a current processing block is searched for in reference pictures in an inter-prediction process. Furthermore, the encoder may provide the decoder with a motion parameter for a reference region.

The encoder/decoder may obtain the reference region of a current processing block using a motion parameter. The reference region is present in a reference picture having a reference index. Furthermore, the pixel value or interpolated value of a reference region specified by a motion vector may be used as the predictor of a current processing block. That is, motion compensation in which an image of a current processing block is predicted from a previously decoded picture is performed using motion information.

In order to reduce the transfer rate related to motion vector information, a method of obtaining a motion vector predictor (mvd) using motion information of previously decoded blocks and transmitting only the corresponding difference (mvd) may be used. That is, the decoder calculates the motion vector predictor of a current processing block using motion information of other decoded blocks and obtains a motion vector value for the current processing block using a difference from the encoder. In obtaining the motion vector predictor, the decoder may obtain various motion vector candidate values using motion information of other already decoded blocks, and may obtain one of the various motion vector candidate values as a motion vector predictor.

Reference Picture Set and Reference Picture List

In order to manage multiple reference pictures, a set of previously decoded pictures are stored in the decoded picture buffer (DPB) for the decoding of the remaining pictures.

A reconstructed picture that belongs to reconstructed pictures stored in the DPB and that is used for inter-prediction is called a reference picture. In other words, a reference picture means a picture including a sample that may be used for inter-prediction in the decoding process of a next picture in a decoding sequence.

A reference picture set (RPS) means a set of reference pictures associated with a picture, and includes all of previously associated pictures in the decoding sequence. A reference picture set may be used for the inter-prediction of an associated picture or a picture following a picture in the decoding sequence. That is, reference pictures retained in the decoded picture buffer (DPB) may be called a reference picture set. The encoder may provide the decoder with a sequence parameter set (SPS) (i.e., a syntax structure having a syntax element) or reference picture set information in each slice header.

A reference picture list means a list of reference pictures used for the inter-prediction of a P picture (or slice) or a B picture (or slice). In this case, the reference picture list may be divided into two reference pictures lists, which may be called a reference picture list 0 (or L0) and a reference picture list 1 (or L1). Furthermore, a reference picture belonging to the reference picture list 0 may be called a reference picture 0 (or L0 reference picture), and a reference picture belonging to the reference picture list 1 may be called a reference picture 1 (or L1 reference picture).

In the decoding process of the P picture (or slice), one reference picture list (i.e., the reference picture list 0). In the decoding process of the B picture (or slice), two reference pictures lists (i.e., the reference picture list 0 and the reference picture list 1) may be used. Information for distinguishing between such reference picture lists for each reference picture may be provided to the decoder through reference picture set information. The decoder adds a reference picture to the reference picture list 0 or the reference picture list 1 based on reference picture set information.

In order to identify any one specific reference picture within a reference picture list, a reference picture index (or reference index) is used.

Fractional Sample Interpolation

A sample of a prediction block for an inter-predicted current processing block is obtained from the sample value of a corresponding reference region within a reference picture identified by a reference picture index. In this case, a corresponding reference region within a reference picture indicates the region of a location indicated by the horizontal component and vertical component of a motion vector. Fractional sample interpolation is used to generate a prediction sample for non-integer sample coordinates except a case where a motion vector has an integer value. For example, a motion vector of ¼ scale of the distance between samples may be supported.

In the case of HEVC, fractional sample interpolation of a luma component applies an 8 tab filter in the traverse direction and longitudinal direction. Furthermore, the fractional sample interpolation of a chroma component applies a 4 tab filter in the traverse direction and the longitudinal direction.

FIG. 6 is an embodiment to which the present invention may be applied and illustrates integers for ¼ sample interpolation and a fraction sample locations.

Referring to FIG. 6, a shadow block in which an upper-case letter (A_i,j) is written indicates an integer sample location, and a block not having a shadow in which a lower-case letter (x_i,j) is written indicates a fraction sample location.

A fraction sample is generated by applying an interpolation filter to an integer sample value in the horizontal direction and the vertical direction. For example, in the case of the horizontal direction, the 8 tab filter may be applied to four integer sample values on the left side and four integer sample values on the right side based on a fraction sample to be generated.

Inter-Prediction Mode

In HEVC, in order to reduce the amount of motion information, a merge mode and advanced motion vector prediction (AMVP) may be used.

1) Merge Mode

The merge mode means a method of deriving a motion parameter (or information) from a spatially or temporally neighbor block.

In the merge mode, a set of available candidates includes spatially neighboring candidates, temporal candidates and generated candidates.

FIG. 7 is an embodiment to which the present invention may be applied and illustrates the location of a spatial candidate.

Referring to FIG. 7(*a*), whether each spatial candidate block is available depending on the sequence of {A1, B1, B0, A0, B2} is determined. In this case, if a candidate block is not encoded in the intra-prediction mode and motion information is present or if a candidate block is located out of a current picture (or slice), the corresponding candidate block cannot be used.

After the validity of a spatial candidate is determined, a spatial merge candidate may be configured by excluding an unnecessary candidate block from the candidate block of a current processing block. For example, if the candidate block of a current prediction block is a first prediction block within the same coding block, candidate blocks having the same motion information other than a corresponding candidate block may be excluded.

When the spatial merge candidate configuration is completed, a temporal merge candidate configuration process is performed in order of {T0, T1}.

In a temporal candidate configuration, if the right bottom block T0 of a collocated block of a reference picture is available, the corresponding block is configured as a temporal merge candidate. The collocated block means a block present in a location corresponding to a current processing block in a selected reference picture. In contrast, if not, a block T1 located at the center of the collocated block is configured as a temporal merge candidate.

A maximum number of merge candidates may be specified in a slice header. If the number of merge candidates is greater than the maximum number, a spatial candidate and temporal candidate having a smaller number than the maximum number are maintained. If not, the number of additional merge candidates (i.e., combined bi-predictive merging candidates) is generated by combining candidates added so far until the number of candidates becomes the maximum number.

The encoder configures a merge candidate list using the above method, and signals candidate block information, selected in a merge candidate list by performing motion estimation, to the decoder as a merge index (e.g., merge_idx [x0][y0]'). FIG. 7(b) illustrates a case where a B1 block has been selected from the merge candidate list. In this case, an "index 1 (Index 1)" may be signaled to the decoder as a merge index.

The decoder configures a merge candidate list like the encoder, and derives motion information about a current prediction block from motion information of a candidate block corresponding to a merge index from the encoder in the merge candidate list. Furthermore, the decoder generates a prediction block for a current processing block based on the derived motion information (i.e., motion compensation).

2) Advanced Motion Vector Prediction (AMVP) Mode

The AMVP mode means a method of deriving a motion vector prediction value from a neighbor block. Accordingly, a horizontal and vertical motion vector difference (MVD), a reference index and an inter-prediction mode are signaled to the decoder. Horizontal and vertical motion vector values are calculated using the derived motion vector prediction value and a motion vector difference (MVDP) provided by the encoder.

That is, the encoder configures a motion vector predictor candidate list, and signals a motion reference flag (i.e., candidate block information) (e.g., mvp_IX_flag[x0][y0]'), selected in motion vector predictor candidate list by performing motion estimation, to the decoder. The decoder configures a motion vector predictor candidate list like the encoder, and derives the motion vector predictor of a current processing block using motion information of a candidate block indicated by a motion reference predictor flag received from the encoder in the motion vector predictor candidate list. Furthermore, the decoder obtains a motion vector value for the current processing block using the derived motion vector predictor and a motion vector difference transmitted by the encoder. Furthermore, the decoder generates a prediction block for the current processing block based on the derived motion information (i.e., motion compensation).

In the case of the AMVP mode, two spatial motion candidates of the five available candidates in FIG. 7 are selected. The first spatial motion candidate is selected from a {A0, A1} set located on the left side, and the second spatial motion candidate is selected from a {B0, B1, B2} set located at the top. In this case, if the reference index of a neighbor candidate block is not the same as a current prediction block, a motion vector is scaled.

If the number of candidates selected as a result of search for spatial motion candidates is 2, a candidate configuration is terminated. If the number of selected candidates is less than 2, a temporal motion candidate is added.

FIG. 8 is an embodiment to which the present invention is applied and is a diagram illustrating an inter-prediction method.

Referring to FIG. 8, the decoder (in particular, the inter-prediction unit 261 of the decoder in FIG. 2) decodes a motion parameter for a processing block (e.g., a prediction unit) (S801).

For example, if the merge mode has been applied to the processing block, the decoder may decode a merge index signaled by the encoder. Furthermore, the motion parameter of the current processing block may be derived from the motion parameter of a candidate block indicated by the merge index.

Furthermore, if the AMVP mode has been applied to the processing block, the decoder may decode a horizontal and vertical motion vector difference (MVD), a reference index and an inter-prediction mode signaled by the encoder. Furthermore, the decoder may derive a motion vector predictor from the motion parameter of a candidate block indicated by a motion reference flag, and may derive the motion vector value of a current processing block using the motion vector predictor and the received motion vector difference.

The decoder performs motion compensation on a prediction unit using the decoded motion parameter (or information) (S802).

That is, the encoder/decoder perform motion compensation in which an image of a current unit is predicted from a previously decoded picture using the decoded motion parameter.

FIG. 9 is an embodiment to which the present invention may be applied and is a diagram illustrating a motion compensation process.

FIG. 9 illustrates a case where a motion parameter for a current block to be encoded in a current picture is uni-direction prediction, a second picture within LIST0, LIST0, and a motion vector (−a, b).

In this case, as in FIG. 9, the current block is predicted using the values (i.e., the sample values of a reference block) of a location (−a, b) spaced apart from the current block in the second picture of LIST0.

In the case of bi-directional prediction, another reference list (e.g., LIST1), a reference index and a motion vector difference are transmitted. The decoder derives two reference blocks and predicts a current block value based on the two reference blocks.

Optical Flow (OF)

An optical flow refers to a motion pattern, such as an object or which surface or an edge in a view. That is, a pattern of a motion for an object is obtained by sequentially extracting differences between images at a specific time and a previous time. In this case, information about more motions can be obtained compared to a case where a difference between a current frame and a previous fame only is obtained. The optical flow has a very important contribution, such as that it enables a target point of a moving object to be obtained in the visual recognition function of an animal having a sense of view and helps to understand the structure of a surrounding environment. Technically, the optical flow may be used to analyze a three-dimensional image in the computer vision system or may be used for image compression. Several methods of realizing the optical flow have been proposed.

In a motion compensation method applying the optical flow, by assuming that pixel values of an object are not changed in consecutive frames (Brightness Constancy Constraint; BCC), a motion of an object may be represented as Equation 1.

$$I(x,y,t)=I(x+\Delta x, y+\Delta y, t+\Delta t) \qquad \text{[Equation 1]}$$

Herein, I(x, y, t) represents a pixel value at coordinate (x, y) on time t. Δ represents variation. That is, Δx represents a variation of x, Δy represents a variation of y, and Δt represents a variation of time t.

Assuming a small motion during a short time, in Equation 1, the right term may be represented as a first order mathematical expression of Taylor series, and may be expanded as represented in Equation 2.

$$I(x, y, t) = I(x, y, t) + \frac{\partial I}{\partial x}\Delta x + \frac{\partial I}{\partial y}\Delta y + \frac{\partial I}{\partial t}\Delta t \quad \text{[Equation 2]}$$

And, when Equation 2 is divided by the variation Δt of time t, and when V_x=Δx/Δt, V_y=Δy/Δt, Equation 2 is arranged as Equation 3.

$$0 = \frac{dI}{dt} = \frac{\partial I}{\partial x}V_x + \frac{\partial I}{\partial y}V_y + \frac{\partial I}{\partial t} \quad \text{[Equation 3]}$$

Herein, V_x and V_y mean x axis component and y axis component of the optical flow (or optical flow motion vector) at I(x, y, t), respectively. ∂I/∂x, ∂I/∂y and ∂I/∂t represent partial derivatives in x axis, y axis and z axis at I(x, y, t), respectively, and may be designated as I_x, I_y and I_t, respectively.

When I_x, I_y and I_t are obtained, the optical flow (or optical flow motion vector) V={V_x, V_y} can be obtained.

Equation 3 may be represented as Equation 4 in a matrix form.

$$\begin{bmatrix} I_x & I_y \end{bmatrix} \begin{bmatrix} V_x \\ V_y \end{bmatrix} = -I_t \quad \text{[Equation 4]}$$

Assuming that A=[I_x, I_y], V=[V_x, V_y]^T and b=−I_t, Equation 4 is as represented in Equation 5.

$$AV=b \quad \text{[Equation 5]}$$

In order to obtain the optical flow (or optical flow motion vector) V, the Least-square (LS) estimation method is used, generally. First, a square error E, which is an LS estimator, may be designed as represented in Equation 6.

$$E = \sum_\omega g(\omega) \times (I_x V_x + I_y V_y + I_t)^2 \quad \text{[Equation 6]}$$

The LS estimator as represented in Equation 6 may be designed by considering the following two factors.

1) In order to solve the Ill-posed problem, a locally steady motion is assumed. That is, it is assumed that the optical flows corresponding to a pixel value included in an arbitrary window w area are similar with each other.

2) Weighting function g is considered, in which a small weight value is provided to a pixel value located far from a window center value and a great weight value is provided to a pixel value located near to the window center value.

When Equation 6 is arranged such that a partial derivative value for V_x and V_y is 0, in order to obtain the optical flow V that maximizes the square error E, Equation 6 is arranged as represented in Equation 7.

$$\frac{\partial E}{\partial V_x} = \sum_\omega g(\omega) \times (V_x I_x^2 + V_y I_x I_y + I_x I_t) = 0 \quad \text{[Equation 7]}$$

$$\frac{\partial E}{\partial V_y} = \sum_\omega g(\omega) \times (V_y I_y^2 + V_x I_x I_y + I_y I_t) = 0$$

Matrix M, b is defined as Equation 8 as below.

$$M = \begin{bmatrix} \sum_\omega g I_x^2 & \sum_\omega g I_x I_y \\ \sum_\omega g I_x I_y & \sum_\omega g I_y^2 \end{bmatrix} \quad \text{[Equation 8]}$$

$$b = -\begin{bmatrix} \sum_\omega g I_x I_t \\ \sum_\omega g I_y I_t \end{bmatrix}$$

Equation 7 is arranged as represented in Equation 9 by using Equation 8.

$$MV=b \quad \text{[Equation 9]}$$

Accordingly, the optical flow V by the LS estimator is determined as Equation 10.

$$V=M^{-1}b \quad \text{[Equation 10]}$$

Bi-Directional Optical Flow (BIO)

BIO is a method of obtaining a motion vector and a reference sample (or prediction sample) value in a unit of sample (pixel) without transmitting an additional motion vector (MV) by using the optical flow.

Further to the first assumption (when an object moves during a short time, the pixel value is not changed) of the optical flow, described above, it is assumed that an object moves in a uniform velocity during a short time.

FIG. 10 illustrates a bi-directional prediction method of a picture having a steady motion as an embodiment to which the present invention may be applied.

Referring to FIG. 10, it is shown the case that bi-directional reference pictures (Refs) 1020 and 1030 are existed with a current picture (or B-slice) 1010 as the center.

At this time, as described above, by the assumption that an object has a steady motion, when the bi-directional reference pictures 1020 and 1030 are existed with the current picture 1010 as the center, a motion vector (hereinafter, referred to as 'a first motion vector') 1022 reaching position A from a corresponding pixel (hereinafter, referred to as 'a first corresponding pixel') in a reference picture 0 (1020), which corresponds to a current pixel 1011 in the current picture 1010 (i.e., coordinate is collated with the current pixel 1011) and a motion vector (hereinafter, referred to as 'a second motion vector') 1032 reaching position B from a corresponding pixel (hereinafter, referred to as 'a second corresponding pixel') in a reference picture 1 (1030), which corresponds to a current pixel 1011 (i.e., coordinate is collated with the current pixel 1011) may be represented as a symmetric value.

That is, the motion vector 1022 and the motion vector 1032 may be represented as vectors of which sizes are the same and of which directions are opposite.

By the two assumptions described above, a difference of pixel values in position A and position B is arranged as represented in Equation 11.

$$\Delta[i,j]=I^0[i+v_x,j+v_y]-I^1[i-v_x,j-v_y] \quad \text{[Equation 11]}$$

Herein, I^0[i+v_x, j+v_y] is a pixel value in position A of the reference picture 0 (Ref0) 1020, and I^1[i−v_x, j−v_y] is a pixel value in position B of the reference picture 1 (Ref1) 1030. In addition, (i, j) means a coordinate of the current pixel 1011 in the current picture 1010.

Each pixel value may be represented as Equation 12.

$$I^0[i+v_x, j+v_y] = I^0[i,j] + \frac{\partial I^0[i,j]}{\partial x}v_x + \frac{\partial I^0[i,j]}{\partial y}v_y \quad \text{[Equation 12]}$$

$$I^1[i-v_x, j-v_y] = I^1[i,j] - \frac{\partial I^1[i,j]}{\partial x}v_x - \frac{\partial I^1[i,j]}{\partial y}v_y$$

When Equation 11 is substituted by Equation 12, Equation 11 may be arranged as Equation 13.

$$\Delta[i,j]=I^{(0)}[i,j]-I^{(1)}[i,j]+v_x[i,j](I_x^{(0)}[i,j]+I_x^{(1)}[i,j])+v_y[i,j](I_y^{(0)}[i,j]+I_y^{(1)}[i,j]) \quad \text{[Equation 13]}$$

I_x^(0)[i, j] and I_y^(0)[i, j] are partial derivative values in x axis and y axis at the first corresponding pixel position in the reference picture 0 (Ref0) 1020, and I_x^(1)[i, j] and I_y^(1)[i, j] are partial derivative values in x axis and y axis at the second corresponding pixel position in the reference picture 1 (Ref1) 1030, which mean gradients (or variations) of the corresponding pixels at position [i, j].

Table 1 represents interpolation filter coefficients which may be used for calculating BIO gradient (or variation).

TABLE 1

| Fractional pel position | Interpolation filter for gradient |
|---|---|
| 0 | {8, −39, −3, 46, −17, 5}, |
| ¼ | {4, −17, −36, 60, −15, 4}, |
| 2/4 | {−1, 4, −57, 57, −4, 1}, |
| 3/4 | {−4, 15, −60, 36, 17, −4} |

By using Equation 14 below and the interpolation filter represented in Table 1, the BIO gradient may be determined.

$$I_x^{(k)}[i,j] = \sum_{n=-M+1}^{M} dF_n(\alpha_x^{(k)})R^{(k)}[i+n, j], k = 0 \text{ or } 1 \quad \text{[Equation 14]}$$

$$I_y^{(k)}[i,j] = \sum_{n=-M+1}^{M} dF_n(\alpha_y^{(k)})R^{(k)}[i, j+n], k = 0 \text{ or } 1$$

Herein, 2*M means the number of filter tabs. α_x^(k) means a fractional part of the motion vector and dF_n(α_x^(k)) means a coefficient of n^th filter tap at α_x^(k). R^(k)[i+n, j] means a reconstructed pixel value at coordinate [i+n, j] in the reference picture k (k is 0 or 1).

Since it is assumed that when an object moves during a short time, the pixel value is not changed, by Equation 13, the motion vectors V_x[i, j] and V_y[i, j] of a unit of pixel, which minimize $\Delta^2$(i, j) can be found.

Consequently, although it is an object to find the motion vector in which the pixel value in position A in the reference picture 0 (1020) and the pixel value in position B in the reference picture 1 (1030) have the same value (or of which difference is the minimum), since an error between pixels may be great, within a predetermined window size, a motion vector in which a difference of pixels is the minimum may be found.

Accordingly, by assuming that there is locally steady motion within window Ω with coordinate [i, j] of the current pixel 1011 at the center, the position of pixel in the window of (2M+1)×(2M+1) size may be represented as [i', j']. At this time, [i', j'] satisfies the condition, i−M≤i'≤i+M, j−M≤j'≤j+M.

Accordingly, the motion vector that minimizes Σ_Ω[Δ²(i', j')] is found.

$$Gx=(I_x^{(0)}[i',j']+I_x^{(1)}[i',j'])$$

$$Gy=(I_y^{(0)}[i',j']+I_y^{(1)}[i',j'])$$

$$\delta P=(P^{(0)}[i',j']-P^{(1)}[i',j']) \quad \text{[Equation 15]}$$

G_x represents a gradient in x axis (i.e., horizontal direction), G_y x represents a gradient in y axis (i.e., vertical direction), and δP represents a gradient in t axis (or variation of a pixel value according to time).

Considering the locally steady motion, when each term of Equation 13 is substituted by Equation 15, Equation 13 is represented as Equation 16.

$$\sum_\Omega \Delta^2(i',j') = \left(Vx\sum_\Omega Gx + Vy\sum_\Omega Gy + \sum_\Omega \delta P\right)^2 \quad \text{[Equation 16]}$$

When Equation 16 is partially differentiated by V_x and V_y, respectively, Equation 16 is represented as Equation 17, respectively.

$$Vx\Sigma_\Omega G^2x+Vy\Sigma_\Omega GxGy+\Sigma_\Omega Gx\delta P=0$$

$$Vx\Sigma_\Omega GxGy+Vy\Sigma_\Omega G^2y+\Sigma_\Omega Gy\delta P=0 \quad \text{[Equation 17]}$$

And, for calculating V_x and V_y, S1 to S12 may be defined as represented in Equation 18.

$$s1 = \sum_\Omega G^2x \quad \text{[Equation 18]}$$

$$s2 = s4 = \sum_\Omega GxGy$$

$$s3 = -\sum_\Omega Gx\delta P$$

$$s5 = \sum_\Omega G^2y$$

$$s6 = -\sum_\Omega Gy\delta P$$

By using Equation 18, V_x and V_y of Equation 17 is arranged as represented in Equation 19, respectively.

$$Vx = \frac{s3s5 - s2s6}{s1s5 - s2s4} \quad \text{[Equation 19]}$$

$$Vy = \frac{s1s6 - s3s4}{s1s5 - s2s4}$$

Accordingly, a predictor of the current pixel can be calculated as represented in Equation 20 by using V_x and V_y.

$$P = \frac{((P^{(0)} + P^{(1)}) + V_x(I_x^{(0)} - I_x^{(1)}) + V_y(I_y^{(0)} - I_y^{(1)}))}{2} \quad \text{[Equation 20]}$$

Herein, P represents a predictor for the current pixel in the current block. P^(0) and P^(1) represent each pixel value of the pixels in which the coordinates are collated with the current pixel in the reference block L0 and reference block L1, respectively (i.e., the first corresponding pixel and the second corresponding pixel).

In the case that a motion vector of a unit of pixel is calculated by using Equation 19 in an encoder/decoder, much amount of calculation may be required. Accordingly, in order to reduce calculation complexity, Equation 19 may be approximated and used as represented in Equation 21.

$$Vx = \frac{s3}{s1} \quad \text{[Equation 21]}$$
$$y = \frac{s6 - Vx*s2}{s5}$$

The BIO method, that is, the Optical flow motion vector refinement method may be performed in the motion compensation procedure in the case that the bi-directional prediction is applied to the current block. The detailed method is described with reference to the following drawing.

FIG. 11 is a diagram illustrating a motion compensation method through the bi-directional prediction according to an embodiment of the present invention.

An encoder/decoder determines whether the True bi-directional prediction is applied to a current block (step, S1101).

That is, the encoder/decoder determines whether the bi-prediction is applied to the current block and the reference picture 0 (Ref0) and the reference picture 1 (Ref1) are opposite on time axis based on the current block (or current picture) (i.e., Picture Order Count (POC) of the current picture is located between POCs of two reference pictures).

As a result of the determination in step S1101, in the case that the True bi-directional prediction is applied to a current block, the encoder/decoder obtains a gradient map of the current block (step, S1102).

When a width and a height of the current block (PU, in the example of HEVC) are denoted by w and h, respectively, the encoder/decoder may obtain the gradient for each of x axis and y axis of each corresponding pixel of (w+4)×(h+4) size, and determine it as the gradient map of x axis and y axis, respectively.

FIG. 12 is a diagram illustrating a method for determining a gradient map according to an embodiment of the present invention.

Referring to FIG. 12, it is assumed the case that a size of a current block 1201 is 8×8. In the case that a window 1202 of 5×5 size is applied to the current block 1201, a gradient map of 12×12 size may be determined.

Referring to FIG. 11 again, the encoder/decoder calculates S1 to S6 values by using the window (1201 in FIG. 12) of 5×5 size (step, S1103).

The S1 to S6 values may be calculated by using Equation 18 described above.

The encoder/decoder determines an OF motion vector of the current pixel (step, S1104).

The method of determining the OF motion vector is described below.

The encoder/decoder calculates an OF predictor, and determines the calculated OF predictor as an optimal predictor (step, S1105).

In other words, the encoder/decoder may calculate a prediction value for the current pixel as represented in Equation 20 by using the OF motion vector (or motion vector of a unit of pixel) which is determined in step S1104, and determine the predictor for the calculated current pixel as an optimal predictor (or final predictor of the current pixel).

As a result of the determination in step S1101, in the case that the True bi-directional prediction is not applied to the current block, the encoder/decoder calculates the bi-directional predictor by performing bi-directional prediction, and determines the calculated bi-directional predictor as an optimal predictor (step, S1106).

That is, in the case that the True bi-directional prediction is not applied to the current block, the motion compensation of a unit of pixel based on the optical flow may not be performed.

FIG. 13 is a diagram illustrating a method of determining an optical flow motion vector according to an embodiment of the present invention.

In FIG. 13, it is described a method of determining a horizontal directional component (i.e., x axis directional component) of an optical flow motion vector (or motion vector of a unit of pixel).

An encoder/decoder determines whether S1 value is greater than a specific threshold value (step, S1301).

As a result of the determination of step S1301, in the case that S1 value is greater than a threshold value, the encoder/decoder obtains V_x value (step, S1302).

At this time, the encoder/decoder may calculate the V_x value by using Equation 19 or Equation 21.

The encoder/decoder determines whether the V_x value obtained in step S1302 is greater than a limit value (step, S1303).

As a result of the determination of step S1303, in the case that the V_x value is greater than the limit value, the encoder/decoder set the V_x value as the limit value (step, S1304).

As a result of the determination of step S1303, in the case that the V_x value is not greater than the limit value, the value which is calculated in step S1302 is determined as the V_x value.

As a result of the determination of step S1301, in the case that S1 value is not greater than a threshold value, the encoder/decoder set the V_x value as 0 (step, S1306).

The encoder/decoder may determine the optical flow motion vector of y axis direction (i.e., horizontal directional component of the optical flow motion vector (or motion vector in a unit of pixel)) in a method similar to the method described in FIG. 13.

First, the encoder/decoder determines whether S5 value is greater than a specific threshold value, and in the case that S5 value is greater than a threshold value, the encoder/decoder calculates the V_y value by using Equation 19 or Equation 21. In addition, the encoder/decoder determines the calculated V_y value is greater than a limit value, and in the case that the V_y value is greater than the limit value, the encoder/decoder set the V_y value as the limit value. In the case that the V_y value is not greater than the limit value, the V_y value is determined as the calculated value. Further, in the case that S5 value is not greater than a threshold value, the encoder/decoder set the V_y value as 0.

After determining the V_x and the V_y, the encoder/decoder may calculate the OF predictor to which the OF motion vector refinement is applied in a unit of pixel by using Equation 20.

Image Processing Method Based on Inter Prediction

According to the existing Bi-directional Optical Flow (BIO) method, it is assumed that an object has a uniform velocity between the reference picture 0 (Ref0) and the reference picture 1 (Ref1), as shown in FIG. 10 described above. Such an assumption may be valid in some degree since the assumption premises a motion of short time duration generally, and practical in the aspect that simple derivation of mathematical expression is available by approximating the motion of time t in Taylor series first order formula.

However, in an actual video image, in many cases, an object may have a non-linear motion, and there is a limit in representing such a non-linear motion of the object only with the linear motion model.

FIG. 14 is a diagram for describing a motion compensation method of a unit of pixel considering a non-linear motion as an embodiment to which the present invention is applied.

Referring to FIG. 14, since the existing BIO method premises a linear motion of an object between a reference block 1402 in reference picture 0 (Ref0) and a reference block 1403 of reference picture 1 (Ref1), in the case that the object moves non-linearly, a position 1405 of the object estimated in a current block (or current picture, B-slice) 1401 may be different from a position 1404 of the object in an actual frame by the existing BIO method, and owing to this, encoding efficiency may be decreased.

Generally, an object has a non-linear motion, but the non-linear motion model has disadvantages that the model is hard to make and complexity in mathematical expression is high, and there is high possibility of failing to estimate an accurate motion in comparison with the linear model in the case that modeling of the non-linear motion is failed. Accordingly, the present invention proposes an OF based motion compensation method that takes the advantage of the linear model selectively.

FIG. 15 is a diagram for illustrating a motion compensation method of a unit of pixel considering a non-linear motion as an embodiment to which the present invention is applied.

In FIG. 15, an object having a non-linear motion is assumed. In the case that a current block (or current picture, B-slice) 1501 is used between a reference picture 0 (Ref0) 1502 and a reference picture 1 (Ref1) 1503, the following assumptions may be additionally considered.

1) A motion of an object is linear between the reference picture 0 (Ref0) 1502 and the current block (or current picture) 1501.

2) A motion of an object is linear between the reference picture 1 (Ref1) 1503 and the current block (or current picture) 1501.

Referring to FIG. 15, by using a pixel value (e.g., bi-directional predictor (Bi-predictor), reconstructed pixel, etc.) in the current block 1501 between two reference pictures 1502 and 1503 under the assumptions, a motion between reference pictures may be subdivided. In addition, through this, a non-linear motion of an object may be represented efficiently and more accurately in comparison with the existing BIO motion model.

Since an original image of the current block (or current picture, B-slice) 1501 is known only in an encoder, for example, in this case, a bi-directional predictor (Bi-predictor) or a reconstructed pixel of the current block may be used instead of the original image of the current block (or current picture, B-slice) 1501.

At this time, the bi-directional predictor (Bi-predictor) may be determined by a conventional bi-directional prediction based on the reference picture 0 1502 and the reference picture 1 1503. In other words, by the existing bi-directional prediction method, two reference blocks may be derived from the reference pictures (Ref0 and Ref1) 1502 and 1503, and by using these, the bi-directional predictor (Bi-predictor) of the current pixel (or current block) may be generated.

Embodiment 1

In this embodiment, it is proposed an advanced bi-directional motion vector refinement method by considering the proposal background described above.

For this, it is assumed as below.

1) There is not pixel value change of an object in consecutive frames Brightness Constancy Constraint).

2) A motion of an object is linear between the reference picture 0 and a current block (or current picture).

3) A motion of an object is linear between the reference picture 1 and a current block (or current picture).

In this embodiment, a motion compensation of a unit of pixel based on the optical flow is performed by using a bi-directional predictor (or bi-predictor), the Decodable condition, that is, mismatch of a reconstructed image between an encoder and a decoder may be avoided.

FIG. 16 is a diagram for illustrating a motion compensation method of a unit of pixel considering a non-linear motion as an embodiment to which the present invention is applied.

Referring to FIG. 16, by the three assumptions described above, when a reference block (hereinafter, referred to as 'a first reference block') 1602 in a reference picture 0 (Ref0) and a reference block (hereinafter, referred to as 'a second reference block') 1603 in a reference picture 1 (Ref1) is located bi-directionally with a current block 1601 as the center, a motion vector that reaches position A 1605 and position B 1606 from a corresponding pixel corresponding to a current pixel 1604 in each reference block, respectively, may be represented in a linear shape.

In addition, a bi-directional predictor of the current pixel 1604 which is generated by performing a bi-directional inter prediction may be used when performing the motion compensation in a unit of pixel.

Hereinafter, in describing the present invention, a pixel (i.e., coordinate is collated with the current pixel 1604 in the reference picture 0) in the first reference block 1602 corresponding to the current pixel 1604 in the current block 1601 is referred to a first corresponding pixel, and a pixel (i.e., coordinate is collated with the current pixel 1604 in the reference picture 0) in the second reference block 1603 corresponding to the current pixel 1604 is referred to a second corresponding pixel.

In addition, a motion vector reaching position A 1605 from the first corresponding pixel is referred to as a first motion vector and a motion vector reaching position B 1606 from the second corresponding pixel is referred to as a second motion vector. However, the terms are not limited thereto, but the first motion vector and the second motion vector may also be referred to as an optical flow, an optical flow motion vector, an optical flow vector, a displacement vector, a motion vector in a unit of pixel, and the like.

A pixel value difference between a pixel 1605 in position A and a bi-directional predictor (bi-predictor) of the current pixel 1604 and a pixel value difference between a pixel 1606 in position B and a bi-directional predictor (bi-predictor) of the current pixel 1604 may be arranged as represented in Equation 22.

$$\Delta^0[i,j] = I^0[i+v_x^0, j+v_y^0] - P[i,j]$$

$$\Delta^1[i,j] = P[i,j] - I^1[i+v_x^1, j+v_y^1] \quad \text{[Equation 22]}$$

Herein, I^0[i+v_x^0, j+v_y^0] is a pixel value of position A pixel 1605 in the first reference block 1602, and I^1[i+v_x^1, j+v_y^1] is a pixel value of position B pixel 1606 in the second reference block 1603. The bi-directional predictor P[i, j] of the current pixel 1604 is a conventional bi-predictor, and defined as represented in Equation 23.

$$P[i,j] = \frac{I^0[i,j] + I^1[i,j]}{2} \quad \text{[Equation 23]}$$

In Equation 22, I^0[i+v_x^0, j+v_y^0] and I^1[i+v_x^1, j+v_y^1] may be approximated as represented in Equation 24 by Taylor series first order expression.

$$I^0[i+v_x^0, j+v_y^0] = I^0[i,j] + \frac{\partial I^0[i,j]}{\partial x} v_x^0 + \frac{\partial I^0[i,j]}{\partial y} v_y^0 \quad \text{[Equation 24]}$$

$$I^1[i+v_x^1, j+v_y^1] = I^1[i,j] + \frac{\partial I^1[i,j]}{\partial x} v_x^1 + \frac{\partial I^1[i,j]}{\partial y} v_y^1$$

Equation 22 is substituted by Equation 23 and Equation 24, and then, represented as Equation 25.

$$\Delta^0[i,j] = \quad \text{[Equation 25]}$$
$$\frac{I^0[i,j] - I^1[i,j]}{2} + v_x^0[i,j] * I_x^0[i,j] + v_y^0[i,j] * I_y^0[i,j]$$

$$\Delta^1[i,j] = \frac{I^0[i,j] - I^1[i,j]}{2} -$$
$$v_x^1[i,j] * I_x^{(1)}[i,j] - v_y^1[i,j] * I_y^{(1)}[i,j]$$

Herein, I_x^(0)[i, j] and I_y^(0)[i, j] mean partial derivative values on x axis and y axis in the first corresponding pixel of coordinate [i, j], respectively, and I_x^(1)[i, j] and I_y^(1)[i, j] mean partial derivative values on x axis and y axis in the second corresponding pixel of coordinate [i, j], respectively, and mean gradients (or variations) of the corresponding pixel in [i, j] position.

Hereinafter, in the description of the present invention, I_x^(0)[i, j] may be referred to a variation (or gradient) in a horizontal direction of the first corresponding pixel, I_y^(0)[i, j] may be referred to a variation (or gradient) in a vertical direction of the first corresponding pixel, I_x^(1)[i, j] may be referred to a variation (or gradient) in a horizontal direction of the second corresponding pixel, and I_y^(1)[i, j] may be referred to a variation (or gradient) in a vertical direction of the second corresponding pixel.

Variations of the first corresponding pixel and the second corresponding pixel may be derived by using a difference value (or variation) of pixel values in the horizontal and vertical directions with first corresponding pixel and the second corresponding pixel at the center, and may be derived by using an interpolation filter of the horizontal and vertical directions with first corresponding pixel and the second corresponding pixel at the center.

In the case that the interpolation filter of the horizontal and vertical directions is applied, I_x^(0)[i, j], I_y^(0)[i, j], I_x^(1)[i, j] and I_y^(1)[i, j] may be calculated by using the interpolation filter of Equation 14 and Table 1 described above.

By using the Least mean square method described above, motion vectors (or optical flow motion vectors) V_x[i, j] and V_y[i, j] may be obtained, which minimize the square term of Equation 25.

Accordingly, by assuming that there is locally steady motion within window Ω with coordinate [i, j] of the current pixel 1011 at the center, the position of pixel in the window of (2M+1)×(2M+1) size may be represented as [i', j']. At this time, [i', j'] satisfies the condition, i−M≤i'≤i+M, j−M≤j'≤j+M.

Accordingly, the motion vector that minimizes Σ_Ω[Δ²(i', j')] is found. The square term of Equation 25 may be represented as Equation 27 considering a simple representation as Equation 26.

Variables used for arranging Equation 25 may be defined as Equation 26.

$$Gx^0 = (I_x^{(0)}[i', j']) \quad \text{[Equation 26]}$$

$$Gy^0 = (I_y^{(0)}[i', j'])$$

$$Gx^1 = (-I_x^{(1)}[i', j'])$$

$$Gy^1 = (-I_y^{(1)}[i', j'])$$

$$dP = \frac{I^0[i,j] - I^1[i,j]}{2}$$

G_x^0 represents a gradient in a horizontal direction in a window area of reference picture 0, G_y^0 represents a gradient in a vertical direction in a window area of reference picture 0, G_x^1 represents a gradient in a horizontal direction in a window area of reference picture 1, and G_y^1 represents a gradient in a vertical direction in a window area of reference picture 1. In addition, dP represents a gradient of time t axis (or variation of pixel value depending on time).

Equation 25 is arranged by using Equation 26, as represented in Equation 27.

$$\sum_\Omega (\Delta^i(i',j'))^2 = \left( V_x^i \sum_\Omega Gx^i + V_y^i \sum_\Omega Gy^i + \sum_\Omega dP \right)^2 \quad \text{[Equation 27]}$$

When Equation 27 is partially differentiated by V_x and V_y, respectively, Equation 27 is represented as Equation 28, respectively.

$$V_x^i \Sigma_\Omega (Gx^i)^2 + V_y^i \Sigma_\Omega Gx^i Gy^i + \Sigma_\Omega Gx^i dP = 0$$

$$V_x^i \Sigma_\Omega Gx^i Gy^i + V_y^i \Sigma_\Omega (Gy^i)^2 + \Sigma_\Omega Gy^i dP = 0 \quad \text{[Equation 28]}$$

And, for calculating V_x and V_y, S1 to S12 may be defined as represented in Equation 29.

$$s1 = \sum_\Omega (Gx^0)^2 \quad \text{[Equation 29]}$$

$$s2 = s4 = \sum_\Omega Gx^0 Gy^0$$

-continued $$s3 = -\sum_\Omega Gx^0 dP$$

$$s5 = \sum_\Omega (Gy^0)^2$$

$$s6 = -\sum_\Omega Gy^0 dP$$

$$s7 = \sum_\Omega (Gx^1)^2$$

$$s8 = s10 = \sum_\Omega Gx^1 Gy^1$$

$$s9 = -\sum_\Omega Gx^1 dP$$

$$s11 = \sum_\Omega (Gy^1)^2$$

$$s12 = -\sum_\Omega Gy^2 dP$$

By using Equation 29, V_x and V_y of Equation 28 is arranged as represented in Equation 30, respectively.

$$V_x^0 = \frac{s3s5 - s2s6}{s1s5 - s2s4}$$ [Equation 30]

$$V_y^0 = \frac{s1s6 - s3s4}{s1s5 - s2s4}$$

$$V_x^1 = \frac{s9s11 - s8s12}{s7s11 - s8s10}$$

$$V_y^1 = \frac{s7s12 - s9s10}{s7s11 - s8s10}$$

Herein, V_x^0 represents a horizontal directional component of the first motion vector, V_y^0 represents a vertical directional component of the first motion vector, V_x^1 represents a horizontal directional component of the second motion vector, and V_y^1 represents a vertical directional component of the second motion vector.

By using V_x^I and V_y^I, predictors of a unit of pixel may be calculated as represented in Equation 31.

$$P_{OF}^0 = I^0[i, j] + v_x^0[i, j] * I_x^0[i, j] + v_y^0[i, j] * I_y^0[i, j]$$ [Equation 31]

$$P_{OF}^1 = I^{(1)}[i, j] + v_x^1[i, j] * I_x^{(1)}[i, j] + v_y^1[i, j] * I_y^{(1)}[i, j]$$

$$P = \frac{P_{OF}^0 + P_{OF}^1}{2}$$

Herein, P_OF^0 is a pixel value of the first corresponding value, a predictor (hereinafter, referred to as 'a first predictor') generated by using a variation (or gradient) for each pixel in a window area of the first reference picture (i.e., reference picture 0) 1602 and the first motion vector, and represents a predictor which is generated through a motion compensation in a unit of pixel based on the optical flow between the current picture 1601 and the first reference picture 1602.

And, P_OF^1 is a pixel value of the second corresponding value, a predictor (hereinafter, referred to as 'a second predictor') generated by using a variation (or gradient) for each pixel in a window area of the second reference picture (i.e., reference picture 1) 1603 and the second motion vector, and represents a predictor which is generated through a motion compensation in a unit of pixel based on the optical flow between the current picture 1601 and the second reference picture 1602.

Referring to Equation 31, by averaging the first predictor and the second predictor, a predictor of the current pixel (or OF-predictor) may be generated.

At this time, in the case that an encoder/decoder calculates a motion vector in a unit of pixel by using Equation 30, large amount of calculation may be required. Accordingly, in order to reduce the calculation complexity, Equation 30 may be approximated and used as represented in Equation 32.

$$V_x^0 = \frac{s3}{s1}$$ [Equation 32]

$$V_y^0 = \frac{s6 - V_x^0 * s2}{s5}$$

$$V_x^1 = \frac{s9}{s7}$$

$$V_y^1 = \frac{s12 - V_x^1 * s8}{s11}$$

The Advanced bi-directional motion vector refinement may be performed in the process of motion compensation in the case that the bi-directional prediction is applied to the current block. A detailed method is described with reference to the following drawing.

FIG. 17 is a diagram illustrating a motion compensation method through the bi-directional prediction according to an embodiment of the present invention.

An encoder/decoder determines whether the True bi-directional prediction is applied to a current block (step, S1701).

That is, the encoder/decoder determines whether the bi-prediction is applied to the current block and the reference picture 0 (Ref0) and the reference picture 1 (Ref1) are opposite on time axis based on the current block (or current picture) (i.e., Picture Order Count (POC) of the current picture is located between POCs of two reference pictures).

As a result of the determination in step S1701, in the case that the True bi-directional prediction is applied to a current block, the encoder/decoder obtains a gradient map of the current block (step, S1702).

When a width and a height of the current block (PU, in the example of HEVC) are denoted by w and h, respectively, the encoder/decoder may obtain the gradient for each of x axis and y axis of each corresponding pixel of (w+4)×(h+4) size, and determine it as the gradient map of x axis and y axis, respectively.

The gradient map may be determined by the method described in FIG. 12.

The encoder/decoder calculates S1 to S12 values by using the window of 5×5 size (step, S1703).

The S1 to S12 values may be calculated by using Equation 29 described above.

The encoder/decoder determines an OF motion vector of the current pixel (step, S1704).

The method of determining the OF motion vector is described below.

The encoder/decoder calculates an OF predictor, and determines the calculated OF predictor as an optimal predictor (step, S7105).

In other words, the encoder/decoder may calculate a prediction value for the current pixel as represented in Equation 31 by using the OF motion vector (or motion vector of a unit of pixel) which is determined in step S1704, and determine the predictor for the calculated current pixel as an optimal predictor (or final predictor of the current pixel).

As a result of the determination in step S1701, in the case that the True bi-directional prediction is not applied to the current block, the encoder/decoder calculates the bi-directional predictor by performing bi-directional prediction, and determines the calculated bi-directional predictor as an optimal predictor (step, S1706).

That is, in the case that the True bi-directional prediction is not applied to the current block, the motion compensation of a unit of pixel based on the optical flow may not be performed.

FIG. 18 is a diagram illustrating a method of determining an optical flow motion vector according to an embodiment of the present invention.

In FIG. 18, it is described a method of determining a horizontal directional component of the first motion vector.

An encoder/decoder determines whether S1 value is greater than a specific threshold value (step, S1801).

As a result of the determination of step S1801, in the case that S1 value is greater than a threshold value, the encoder/decoder obtains V_x^0 value (step, S1802).

At this time, the encoder/decoder may calculate the V_x^0 value by using Equation 30 or Equation 32 that approximates Equation 30.

The encoder/decoder determines whether the V_x^0 value obtained in step S1802 is greater than a limit value (step, S1803).

As a result of the determination of step S1803, in the case that the V_x^0 value is greater than the limit value, the encoder/decoder set the V_x^0 value as the limit value (step, S1804).

As a result of the determination of step S1803, in the case that the V_x^0 value is not greater than the limit value, the value which is calculated in step S1802 is determined as the V_x^0 value.

As a result of the determination of step S1801, in the case that S1 value is not greater than a threshold value, the encoder/decoder set the V_x^0 value as 0 (step, S1805).

The encoder/decoder may determine a vertical directional component of the first motion vector in a method similar to the method described in FIG. 13.

First, the encoder/decoder determines whether S5 value is greater than a specific threshold value, and in the case that S5 value is greater than a threshold value, the encoder/decoder calculates the V_y^0 value by using Equation 30 or Equation 32. In addition, the encoder/decoder determines the calculated V_y^0 value is greater than a limit value, and in the case that the V_y^0 value is greater than the limit value, the encoder/decoder set the V_y^0 value as the limit value. In the case that the V_y^0 value is not greater than the limit value, the V_y^0 value is determined as the calculated value. Further, in the case that S5 value is not greater than a threshold value, the encoder/decoder set the V_y^0 value as 0.

Similarly, the encoder/decoder may determine a horizontal directional component of the second motion vector in the following method.

First, the encoder/decoder determines whether S7 value is greater than a specific threshold value, and in the case that S7 value is greater than a threshold value, the encoder/decoder calculates the V_x^1 value by using Equation 30 or Equation 32. In addition, the encoder/decoder determines the calculated V_x^1 value is greater than a limit value, and in the case that the V_x^1 value is greater than the limit value, the encoder/decoder set the V_x^1 value as the limit value. In the case that the V_x^1 value is not greater than the limit value, the V_x^1 value is determined as the calculated value. Further, in the case that S7 value is not greater than a threshold value, the encoder/decoder set the V_x^1 value as 0.

Similarly, the encoder/decoder may determine a vertical directional component of the second motion vector in the following method.

First, the encoder/decoder determines whether S11 value is greater than a specific threshold value, and in the case that S11 value is greater than a threshold value, the encoder/decoder calculates the V_y^1 value by using Equation 30 or Equation 32. In addition, the encoder/decoder determines the calculated V_y^1 value is greater than a limit value, and in the case that the V_y^1 value is greater than the limit value, the encoder/decoder set the V_y^1 value as the limit value. In the case that the V_y^1 value is not greater than the limit value, the V_y^1 value is determined as the calculated value. Further, in the case that S11 value is not greater than a threshold value, the encoder/decoder set the V_y^1 value as 0.

After determining the horizontal and vertical components of the first motion vector and the horizontal and vertical components of the second motion vector, the encoder/decoder may calculate the OF predictor to which the OF motion vector refinement is applied in a unit of pixel by using Equation 31.

In other words, the encoder/decoder may generate the first predictor by using the pixel value of the first corresponding pixel, the variation (or gradient) for each pixel in a window area in the first reference pixel, and generate the second predictor by using the pixel value of the second corresponding pixel, the variation (or gradient) for each pixel in a window area in the second reference pixel. And, the encoder/decoder may generate a predictor of the current pixel (or OF-predictor) by averaging the first predictor and the second predictor.

FIG. 19 is a diagram illustrating a method for processing an image based in an inter prediction according to an embodiment of the present invention.

An encoder/decoder generates a bi-directional predictor of each pixel of a current block by performing a bi-directional inter prediction based on a motion vector of the current block (step, S1901).

That is, the encoder/decoder may generate the bi-directional predictor of each pixel constructing the current block by using the inter prediction method described in FIG. 5 to FIG. 9 above.

The bi-directional predictor may be a conventional bi-predictor and calculated by using Equation 23.

The encoder/decoder derives a first motion vector from a window area of a specific size in a first reference picture for a current pixel, and deriving a second motion vector from a window area of a specific size in a second reference picture for the current pixel (step, S1902).

The encoder/decoder may perform the OF based motion compensation in a unit of each pixel in the current block.

As described above, the bi-directional predictor of the current pixel of the current block between two reference pictures is used for the motion compensation in a unit of pixel, a motion of an object located between reference pictures may be subdivided, and through this, a non-linear motion of the object may be more efficiently represented in comparison with the existing BIO method.

Particularly, the first motion vector may be determined with a motion vector in which a predictor is derived, which minimizes a difference from the bi-directional predictor for each pixel in the window area in the first reference picture, and the second motion vector may be determined with a motion vector in which a predictor is derived, which minimizes a difference from the bi-directional predictor for each pixel in the window area in the second reference picture.

In other words, the first motion vector and the second motion vector may be determined as the motion vectors that minimize the square term of Equation 25 described above in each specific size of window area.

In addition, first motion vector may be determined with a motion vector that minimizes a sum of a gradient for each pixel and a sum of a difference from the bi-directional predictor for each pixel in the window area in the first reference picture, and the second motion vector may be determined with a motion vector that minimizes a sum of a gradient for each pixel and a sum of a difference from the bi-directional predictor for each pixel in the window area in the second reference picture.

Particularly, the first motion vector may be derived using a difference value between a gradient for each pixel and the bi-directional predictor in the window area in the first reference picture, and the second motion vector may be derived using a difference value between a gradient for each pixel and the bi-directional predictor in the window area in the second reference picture.

As described above, the first motion vector and the second motion vector may be derived by Equation 30, and in order to reduce the calculation complexity in the encoder/decoder, Equation 30 may be approximated and used as represented in Equation 32.

Furthermore, as described above, S1 to S12 used in Equation 30 and Equation 32 may be calculated by using Equation 29.

A vertical directional component and a horizontal directional component of the gradient may be obtained by using a difference value between a horizontal direction pixel value and a vertical direction pixel value with a pixel of which coordinate is collocated with the current pixel in a center in the first reference picture or the second reference picture.

In addition, a vertical directional component and a horizontal directional component of the gradient may be obtained by applying interpolation filters of a horizontal direction and a vertical direction with a pixel of which coordinate is collocated with the current pixel in a center in the first reference picture or the second reference picture.

In the case that the interpolation filter is applied, the variation (or gradient) of the horizontal and vertical directions of the first corresponding pixel and the variation (or gradient) of the horizontal and vertical directions of the second corresponding pixel may be calculated by using the interpolation filter described in Equation 14 and exemplified in Table 1 above.

Further, as described above, the horizontal directional component and the vertical directional component of the first motion vector and the horizontal directional component and the vertical directional component of the second motion vector may be obtained from Equation 30 and Equation 32 in the case that each of S1, S5, S7 and S11 values exceeds a specific threshold value. In addition, in the case that each of S1, S5, S7 and S11 values does not exceed a specific threshold value, each of the components may be set to 0.

The encoder/decoder derives a first predictor for the current pixel by using the first motion vector, and derives a second predictor for the current pixel by using the second motion vector (step, S1903).

The first predictor may be generated by using a gradient for each pixel and the first motion vector in the window area in the first reference picture, and the second predictor may be generated by using a gradient for each pixel and the second motion vector in the window area in the second reference picture.

In other words, as represented in Equation 31, the first predictor may be generate by using the pixel value of the first corresponding pixel, the variation of the horizontal and vertical directions in a window in the first reference picture, and the second predictor may be generate by using the pixel value of the second corresponding pixel, the variation of the horizontal and vertical directions in a window in the second reference picture.

The encoder/decoder generates a third predictor of each pixel of the current block by performing a weighted sum of the first predictor and the second predictor (step, S1904).

Here, the third predictor means a predictor of the current pixel which is derived through the motion compensation in a unit of pixel based on the optical flow (i.e., OF-predictor).

In other words, the encoder/decoder generates a predictor of the pixels that construct the current block by performing a weighted sum of the first predictor and the second predictor.

As exemplified in Equation 30 above, the third predictor which is a predictor of the current pixel based on the optical flow may be generated by averaging the first predictor and the second predictor.

FIG. 20 is a diagram illustrating an inter prediction unit according to an embodiment of the present invention.

For the convenience of description, in FIG. 20, the inter prediction unit (181, refer to FIG. 1; 261, refer to FIG. 2) is shown as a separate element, but the inter prediction unit 181 or 261 may be implemented as an element which is included in an encoder and/or a decoder.

Referring to FIG. 20, the inter prediction unit implements the function, the process and/or the method proposed in FIG. 5 to FIG. 20 above. Particularly, the inter prediction unit 181 or 261 may include a bi-directional predictor generation unit 2001, a motion vector derivation unit in a unit of pixel 2002, a first predictor and second predictor derivation unit 2003 and a third predictor generation unit 2004.

The bi-directional predictor generation unit 2001 generates a bi-directional predictor of each pixel of a current block by performing a bi-directional inter prediction based on a motion vector of the current block.

That is, the bi-directional predictor generation unit 2001 may generate the bi-directional predictor of each pixel constructing the current block by using the inter prediction method described in FIG. 5 to FIG. 9 above.

The bi-directional predictor may be a conventional bi-predictor and calculated by using Equation 23.

The motion vector derivation unit in a unit of pixel 2002 derives a first motion vector from a window area of a specific size in a first reference picture for a current pixel, and deriving a second motion vector from a window area of a specific size in a second reference picture for the current pixel.

The motion vector derivation unit in a unit of pixel 2002 may perform the OF based motion compensation in a unit of each pixel in the current block.

As described above, the bi-directional predictor of the current pixel of the current block between two reference pictures is used for the motion compensation in a unit of pixel, a motion of an object located between reference pictures may be subdivided, and through this, a non-linear motion of the object may be more efficiently represented in comparison with the existing BIO method.

Particularly, the motion vector derivation unit in a unit of pixel 2002 may determine a motion vector in which a predictor is derived, which minimizes a difference from the bi-directional predictor for each pixel in the window area in the first reference picture to the first motion vector, and determine a motion vector in which a predictor is derived, which minimizes a difference from the bi-directional predictor for each pixel in the window area in the second reference picture to the second motion vector.

In other words, the first motion vector and the second motion vector may be determined as the motion vectors that minimize the square term of Equation 25 described above in each specific size of window area.

In addition, first motion vector may be determined with a motion vector that minimizes a sum of a gradient for each pixel and a sum of a difference from the bi-directional predictor for each pixel in the window area in the first reference picture, and the second motion vector may be determined with a motion vector that minimizes a sum of a gradient for each pixel and a sum of a difference from the bi-directional predictor for each pixel in the window area in the second reference picture.

Particularly, the first motion vector may be derived using a difference value between a gradient for each pixel and the bi-directional predictor in the window area in the first reference picture, and the second motion vector may be derived using a difference value between a gradient for each pixel and the bi-directional predictor in the window area in the second reference picture.

As described above, the first motion vector and the second motion vector may be derived by Equation 30, and in order to reduce the calculation complexity in the motion vector derivation unit in a unit of pixel 2002, Equation 30 may be approximated and used as represented in Equation 32.

Furthermore, as described above, S1 to S12 used in Equation 30 and Equation 32 may be calculated by using Equation 29.

A vertical directional component and a horizontal directional component of the gradient may be obtained by using a difference value between a horizontal direction pixel value and a vertical direction pixel value with a pixel of which coordinate is collocated with the current pixel in a center in the first reference picture or the second reference picture.

In addition, a vertical directional component and a horizontal directional component of the gradient may be obtained by applying interpolation filters of a horizontal direction and a vertical direction with a pixel of which coordinate is collocated with the current pixel in a center in the first reference picture or the second reference picture.

In the case that the interpolation filter is applied, the variation (or gradient) of the horizontal and vertical directions of the first corresponding pixel and the variation (or gradient) of the horizontal and vertical directions of the second corresponding pixel may be calculated by using the interpolation filter described in Equation 14 and exemplified in Table 1 above.

Further, as described above, the horizontal directional component and the vertical directional component of the first motion vector and the horizontal directional component and the vertical directional component of the second motion vector may be obtained from Equation 30 and Equation 32 in the case that each of S1, S5, S7 and S11 values exceeds a specific threshold value. In addition, in the case that each of S1, S5, S7 and S11 values does not exceed a specific threshold value, each of the components may be set to 0.

The first predictor and second predictor derivation unit 2003 derives a first predictor for the current pixel by using the first motion vector, and derives a second predictor for the current pixel by using the second motion vector.

The first predictor may be generated by using a gradient for each pixel and the first motion vector in the window area in the first reference picture, and the second predictor may be generated by using a gradient for each pixel and the second motion vector in the window area in the second reference picture.

In other words, as represented in Equation 31, the first predictor and second predictor derivation unit 2003 may generate the first predictor by using the pixel value of the first corresponding pixel, the variation of the horizontal and vertical directions in a window in the first reference picture, and generate the second predictor by using the pixel value of the second corresponding pixel, the variation of the horizontal and vertical directions in a window in the second reference picture.

The third predictor generation unit 2004 generates a third predictor of each pixel of the current block by performing a weighted sum of the first predictor and the second predictor.

Here, the third predictor means a predictor of the current pixel which is derived through the motion compensation in a unit of pixel based on the optical flow (i.e., OF-predictor).

In other words, the third predictor generation unit 2004 generates a predictor of the pixels that construct the current block by performing a weighted sum of the first predictor and the second predictor.

As exemplified in Equation 30 above, the third predictor which is a predictor of the current pixel based on the optical flow may be generated by averaging the first predictor and the second predictor.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method for processing an image based on an inter prediction by an apparatus, comprising:
   generating a bi-directional predictor of each pixel of a current block by performing a bi-directional inter prediction based on a motion vector of the current block;
   deriving a first motion vector from a window area of a specific size in a first reference picture for a current pixel, and deriving a second motion vector from a window area of a specific size in a second reference picture for the current pixel,
   wherein a horizontal directional component of the first motion vector is configured as 0, when a sum of squared values of the horizontal directional component of a gradient for each pixel is smaller than a specific threshold value,
   wherein a vertical directional component of the first motion vector is configured as 0, when a sum of squared values of the vertical directional component of a gradient for each pixel is smaller than a specific threshold value,
   wherein a horizontal directional component of the second motion vector is configured as 0, when a sum of squared values of the horizontal directional component of a gradient for each pixel is smaller than a specific threshold value, and
   wherein a vertical directional component of the second motion vector is configured as 0, when a sum of squared values of the vertical directional component of a gradient for each pixel is smaller than a specific threshold value;
   deriving a first predictor for the current pixel using the first motion vector, and deriving a second predictor for the current pixel using the second motion vector; and
   generating a third predictor of each pixel of the current block by performing a weighted sum of the first predictor and the second predictor.

2. The method of claim 1, wherein a vertical directional component and a horizontal directional component of the gradient are obtained by using a difference value between a horizontal direction pixel value and a vertical direction pixel value with a pixel of which coordinate is collocated with the current pixel in a center in the first reference picture or the second reference picture.

3. The method of claim 1, wherein a vertical directional component and a horizontal directional component of the gradient are obtained by applying interpolation filters of a horizontal direction and a vertical direction with a pixel of which coordinate is collocated with the current pixel in a center in the first reference picture or the second reference picture.

4. The method of claim 1, wherein the first predictor is generated by using a gradient for each pixel and the first motion vector in the window area in the first reference picture, and
   wherein the second predictor is generated by using a gradient for each pixel and the second motion vector in the window area in the second reference picture.

5. An apparatus for processing an image based on an inter prediction, comprising:
   a memory; and
   a processor configured to generate a bi-directional predictor of each pixel of a current block by performing a bi-directional inter prediction based on a motion vector of the current block,
   derive a first motion vector from a window area of a specific size in a first reference picture for a current pixel, and derive a second motion vector from a window area of a specific size in a second reference picture for the current pixel,
   wherein a horizontal directional component of the first motion vector is configured as 0, when a sum of squared values of the horizontal directional component of a gradient for each pixel is smaller than a specific threshold value,
   wherein a vertical directional component of the first motion vector is configured as 0, when a sum of squared values of the vertical directional component of a gradient for each pixel is smaller than a specific threshold value,
   wherein a horizontal directional component of the second motion vector is configured as 0, when a sum of squared values of the horizontal directional component of a gradient for each pixel is smaller than a specific threshold value, and
   wherein a vertical directional component of the second motion vector is configured as 0, when a sum of squared values of the vertical directional component of a gradient for each pixel is smaller than a specific threshold value,
   derive a first predictor for the current pixel using the first motion vector, and derive a second predictor for the current pixel using the second motion vector, and
   generate a third predictor of each pixel of the current block by performing a weighted sum of the first predictor and the second predictor.

* * * * *